United States Patent
Horn et al.

(10) Patent No.: US 9,603,062 B2
(45) Date of Patent: Mar. 21, 2017

(54) CLASSIFYING ACCESS POINTS USING PILOT IDENTIFIERS

(75) Inventors: Gavin B. Horn, La Jolla, CA (US); Fatih Ulupinar, San Diego, CA (US); Parag A. Agashe, San Diego, CA (US); Rajat Prakash, San Diego, CA (US); Aamod Khandekar, San Diego, CA (US); Alexei Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 579 days.

(21) Appl. No.: 12/269,642

(22) Filed: Nov. 12, 2008

(65) Prior Publication Data

US 2009/0135784 A1    May 28, 2009

Related U.S. Application Data

(60) Provisional application No. 60/988,631, filed on Nov. 16, 2007, provisional application No. 60/988,641, (Continued)

(51) Int. Cl.
*H04W 36/00*    (2009.01)

(52) U.S. Cl.
CPC ............................... *H04W 36/0055* (2013.01)

(58) Field of Classification Search
None
See application file for complete search history.

(56) References Cited

U.S. PATENT DOCUMENTS 5,535,424 A * 7/1996 de Seze et al. ............... 455/515
5,640,677 A   6/1997 Karlsson
(Continued)

FOREIGN PATENT DOCUMENTS

| CN | 1110457 A | 10/1995 |
|---|---|---|
| CN | 1675954 A | 9/2005 |

(Continued)

OTHER PUBLICATIONS

3GPP TS 36.304 v8.0.0: "3rd Generation Partnership Project; Technical Specification Group Radio Access Network; Evolved Universal Terrestrial Radio Access (E-UTRA); User Equipment (UE) procedures in idle mode (Realease 8)," [Online] (Dec. 1, 2007), pp. 1-27, XP002524390.

(Continued)

*Primary Examiner* — Steve Young

(57) ABSTRACT

Systems and methodologies are described that facilitate grouping pilot identifies to indicate type and/or classification information regarding one or more access points. The access points can select or be assigned pilot identifiers from the group indicating a type or classification related to the access points. Thus, identifiers can be grouped into macrocell and/or femtocell groups or ranges such that an access point can indicate, and mobile devices can efficiently determine, whether the access point provides macrocell or femtocell coverage based on a range from which its pilot identifier is selected or assigned. In addition, the pilot identifiers can be utilized to indicate restricted association information regarding the access points.

41 Claims, 12 Drawing Sheets

Related U.S. Application Data filed on Nov. 16, 2007, provisional application No. 60/988,649, filed on Nov. 16, 2007, provisional application No. 61/025,093, filed on Jan. 31, 2008.

(56) References Cited

U.S. PATENT DOCUMENTS

| | | | |
|---|---|---|---|
| 5,722,072 A | 2/1998 | Crichton et al. | |
| 5,778,316 A | 7/1998 | Persson et al. | |
| 5,896,373 A | 4/1999 | Mitts et al. | |
| 5,930,710 A | 7/1999 | Sawyer et al. | |
| 6,067,460 A | 5/2000 | Alanara et al. | |
| 6,151,484 A * | 11/2000 | Ramesh | 455/68 |
| 6,516,193 B1 | 2/2003 | Salmela et al. | |
| 6,529,491 B1 | 3/2003 | Chang et al. | |
| 6,542,744 B1 | 4/2003 | Lin | |
| 6,717,925 B1 | 4/2004 | Leppisaari et al. | |
| 6,751,460 B2 | 6/2004 | Korpela et al. | |
| 6,792,284 B1 | 9/2004 | Dalsgaard et al. | |
| 7,047,009 B2 | 5/2006 | Laroia et al. | |
| 7,289,473 B1 | 10/2007 | Padovani et al. | |
| 7,379,739 B2 | 5/2008 | Rajkotia et al. | |
| 7,480,265 B2 | 1/2009 | Cromer et al. | |
| 7,512,110 B2 | 3/2009 | Sayeedi et al. | |
| 7,706,793 B2 * | 4/2010 | Zhang | 455/435.2 |
| 7,742,498 B2 * | 6/2010 | Barzegar et al. | 370/465 |
| 7,864,736 B2 * | 1/2011 | Yashar | H04W 48/20 370/332 |
| 7,869,792 B1 | 1/2011 | Zhou et al. | |
| 7,925,259 B2 | 4/2011 | Nylander et al. | |
| 7,929,970 B1 | 4/2011 | Gunasekara et al. | |
| 7,937,086 B2 | 5/2011 | Chen et al. | |
| 8,032,153 B2 | 10/2011 | Karr et al. | |
| 8,588,773 B2 * | 11/2013 | Deshpande | H04J 11/0093 370/328 |
| 8,737,229 B2 | 5/2014 | Khandekar et al. | |
| 8,737,295 B2 | 5/2014 | Horn et al. | |
| 8,848,656 B2 | 9/2014 | Horn et al. | |
| 8,902,867 B2 | 12/2014 | Horn et al. | |
| 2002/0019231 A1 | 2/2002 | Palenius et al. | |
| 2002/0168982 A1 | 11/2002 | Sorokine et al. | |
| 2003/0008663 A1 | 1/2003 | Stein et al. | |
| 2003/0051132 A1 | 3/2003 | Kobayashi et al. | |
| 2003/0134642 A1 | 7/2003 | Kostic et al. | |
| 2003/0220075 A1 | 11/2003 | Baker et al. | |
| 2004/0009779 A1 | 1/2004 | Qu et al. | |
| 2004/0082328 A1 | 4/2004 | Japenga et al. | |
| 2004/0116110 A1 * | 6/2004 | Amerga | H04W 48/16 455/422.1 |
| 2004/0136340 A1 | 7/2004 | Sanchez et al. | |
| 2004/0198220 A1 | 10/2004 | Whelan et al. | |
| 2004/0202131 A1 | 10/2004 | An et al. | |
| 2005/0037798 A1 * | 2/2005 | Yamashita et al. | 455/525 |
| 2005/0099998 A1 | 5/2005 | Semper | |
| 2005/0124344 A1 | 6/2005 | Laroia et al. | |
| 2005/0202823 A1 | 9/2005 | Shaheen et al. | |
| 2005/0245260 A1 | 11/2005 | Nielsen et al. | |
| 2006/0025127 A1 | 2/2006 | Cromer et al. | |
| 2006/0040700 A1 | 2/2006 | Roberts et al. | |
| 2006/0148479 A1 | 7/2006 | Park et al. | |
| 2006/0173976 A1 | 8/2006 | Vincent et al. | |
| 2006/0184680 A1 * | 8/2006 | Ruutu et al. | 709/229 |
| 2006/0189308 A1 | 8/2006 | Kurata et al. | |
| 2006/0233150 A1 | 10/2006 | Cherian | |
| 2006/0258354 A1 | 11/2006 | Ul Haq | |
| 2006/0268746 A1 | 11/2006 | Wijting et al. | |
| 2006/0268800 A1 | 11/2006 | Sugaya et al. | |
| 2006/0276201 A1 | 12/2006 | Dupray et al. | |
| 2007/0054666 A1 | 3/2007 | Choi | |
| 2007/0097938 A1 | 5/2007 | Nylander et al. | |
| 2007/0098053 A1 * | 5/2007 | Rinne et al. | 375/149 |
| 2007/0104166 A1 | 5/2007 | Rahman et al. | |
| 2007/0147286 A1 | 6/2007 | Laroia et al. | |
| 2007/0211745 A1 | 9/2007 | Deshpande et al. | |
| 2007/0229373 A1 | 10/2007 | Mashima et al. | |
| 2007/0232307 A1 | 10/2007 | Ibrahim et al. | |
| 2007/0249291 A1 | 10/2007 | Nanda et al. | |
| 2007/0250713 A1 | 10/2007 | Rahman, I et al. | |
| 2007/0254596 A1 | 11/2007 | Corson et al. | |
| 2008/0002692 A1 | 1/2008 | Meylan et al. | |
| 2008/0004025 A1 | 1/2008 | Lee | |
| 2008/0039099 A1 | 2/2008 | An et al. | |
| 2008/0069065 A1 | 3/2008 | Wu et al. | |
| 2008/0101301 A1 | 5/2008 | Thomas et al. | |
| 2008/0132239 A1 | 6/2008 | Khetawat et al. | |
| 2008/0192696 A1 | 8/2008 | Sachs et al. | |
| 2008/0267114 A1 | 10/2008 | Mukherjee et al. | |
| 2008/0287134 A1 | 11/2008 | Catovic et al. | |
| 2008/0299975 A1 | 12/2008 | Sanchez et al. | |
| 2008/0305801 A1 | 12/2008 | Burgess et al. | |
| 2009/0047954 A1 | 2/2009 | Tenny et al. | |
| 2009/0047955 A1 | 2/2009 | Frenger et al. | |
| 2009/0047960 A1 * | 2/2009 | Gunnarsson et al. | 455/436 |
| 2009/0047968 A1 * | 2/2009 | Gunnarsson | H04W 48/12 455/446 |
| 2009/0052395 A1 | 2/2009 | Bao et al. | |
| 2009/0086672 A1 | 4/2009 | Gholmieh et al. | |
| 2009/0124284 A1 | 5/2009 | Scherzer et al. | |
| 2009/0137228 A1 | 5/2009 | Horn et al. | |
| 2009/0252113 A1 | 10/2009 | Take | |
| 2009/0253432 A1 | 10/2009 | Willey et al. | |
| 2009/0280819 A1 | 11/2009 | Brisebois et al. | |
| 2009/0285113 A1 | 11/2009 | Yavuz et al. | |
| 2010/0027510 A1 | 2/2010 | Balasubramanian et al. | |
| 2010/0110945 A1 | 5/2010 | Koskela et al. | |
| 2010/0184439 A1 | 7/2010 | Chen et al. | |
| 2010/0227645 A1 | 9/2010 | Keevill et al. | |
| 2010/0240367 A1 | 9/2010 | Lee et al. | |
| 2010/0240368 A1 | 9/2010 | Fox et al. | |
| 2010/0260139 A1 | 10/2010 | Baeckstroem et al. | |
| 2010/0323663 A1 | 12/2010 | Vikberg et al. | |
| 2011/0263260 A1 | 10/2011 | Yavuz et al. | |
| 2013/0065594 A1 | 3/2013 | Somasundaram et al. | |
| 2014/0045495 A1 | 2/2014 | Deshpande et al. | |
| 2015/0029930 A1 | 1/2015 | Horn et al. | |

FOREIGN PATENT DOCUMENTS

| | | |
|---|---|---|
| CN | 1675956 A | 9/2005 |
| CN | 1701584 A | 11/2005 |
| CN | 1842210 A | 10/2006 |
| CN | 1964522 A | 5/2007 |
| CN | 101015221 A | 8/2007 |
| DE | 19510256 | 9/1995 |
| EP | 0589552 | 3/1994 |
| EP | 1670179 | 6/2006 |
| EP | 1699253 | 9/2006 |
| EP | 1717993 | 11/2006 |
| EP | 1775976 | 4/2007 |
| EP | 1835780 | 9/2007 |
| EP | 2077690 | 7/2009 |
| JP | 8501430 | 2/1996 |
| JP | 2003506960 A | 2/2003 |
| JP | 2003116162 A | 4/2003 |
| JP | 2004159304 A | 6/2004 |
| JP | 2004166273 A | 6/2004 |
| JP | 2004260824 A | 9/2004 |
| JP | 2006148836 A | 6/2006 |
| JP | 2007104417 A | 4/2007 |
| JP | 2007534227 A | 11/2007 |
| JP | 2009504050 A | 1/2009 |
| JP | 2009510973 A | 3/2009 |
| KR | 100711531 | 4/2007 |
| RU | 2145774 C1 | 2/2000 |
| RU | 2199834 C2 | 2/2003 |
| RU | 2005129268 A | 3/2007 |
| WO | WO-9502309 A1 | 1/1995 |
| WO | WO-0133744 | 5/2001 |
| WO | WO02080600 | 10/2002 |
| WO | WO03009633 | 1/2003 |
| WO | WO2004019643 | 3/2004 |
| WO | WO2004054310 | 6/2004 |
| WO | WO-2005065214 A2 | 7/2005 |
| WO | WO-2005122621 A1 | 12/2005 |

(56) References Cited

FOREIGN PATENT DOCUMENTS

| WO | WO-2007015066 A2 | 2/2007 |
|---|---|---|
| WO | WO-2007015071 A2 | 2/2007 |
| WO | WO-2007040452 A1 | 4/2007 |
| WO | WO-2007040454 A2 | 4/2007 |
| WO | WO2007080490 | 7/2007 |
| WO | WO2007096763 A2 | 8/2007 |
| WO | WO2007097672 | 8/2007 |
| WO | WO2007097673 | 8/2007 |
| WO | WO2008030956 | 3/2008 |
| WO | WO2008124282 | 10/2008 |
| WO | WO2009007720 | 1/2009 |
| WO | WO2009053710 | 4/2009 |
| WO | WO-2009064930 | 5/2009 |
| WO | WO2009064931 | 5/2009 |
| WO | WO-2011050338 A1 | 4/2011 |

OTHER PUBLICATIONS

ETSI TS 125.304 V7.1.0: "Universal Mobile Telecommunications System (UMTS); User Equipment (UE) procedures in idle mode and procedures for cell reselection in connected mode (3GPP TS 25.304 version 7.1.0 Release 7)" ETSI Standards, Sophia Antipolis Cedex, France, (Dec. 1, 2006), XP014039981.
International Search Report and the Written Opinion—PCT/US2008/083632, International Search Authority—European Patent Office—Mar. 25, 2009.
Jung, Young-Ho et al: "PN offset Planning for Synchronous CDMA Based Fiber-Optic Microcellular Systems," Vehicular Technology Conference Proceedings, 2000. Internet Citation, (May 2000), pp. 2275-2279, XP002480275 [retrieved on May 15, 2000] paragraphs [0001]—[00V1], doi: 10.1109/VETECS.2000.851678.
Qualcomm Europe: "Implicit Priority for CSG cells," 3GPP TSG-RAN WG2 #63bis, R2-086586, (Nov. 10, 2008), XP002557108.
Qualcomm Europe: "Linger timer for HeNB reselection to improve standby time of UE in mobility situations," 3GPP Draft TSG-RAN WG2 meeting #63; R2-084155, 3rd Generation Partnership Project (3GPP), Jeju, Korea; (Aug. 12, 2008), XP050319291.
Qualcomm Europe: "Linger Timer for HNB Cell Reselection," 3GPP Draft TSG-RAN WG2 meeting #63; R2-084342, 3rd Generation Partnership Project (3GPP), Jeju, Korea, (Aug. 22, 2008), XP050319418.
Qualcomm Europe: "Parameter for HNB White List Cell Selection," 3GPP Draft TSG-RAN WG2 meeting #63; R2-084552, 3rd Generation Partnership Project (3GPP), Jeju, Korea (Aug. 18, 2008), XP050319589.
Qualcomm Europe: "Utra HNB Idle Mode (Re)selection," 3GPP Draft TSG-RAN WG2 #62bis; R2-084347, 3rd Generation Partnership Project (3GPP), Jeju, Korea (Aug. 18, 2008), XP050319423.
Rapporteur (Huawei): "Email report on Home-(e)NB mobility, main issues [63_LTE_C01,]" 3GPP Draft TSG-RAN2 Meeting #63bis; R2-085705, 3rd Generation Partnership Project (3GPP), Prague, Czech Republic; (Oct. 1, 2008), XP050320478.
3GPP TR 24.801: "Pseudo-CR on Allowed CSG List update," 3GPP TSG CT WG1 meeting #55; C1-083427, v 1.1.1, Budapest, Hungary, Aug. 18-22, 2008.

ASUSTeK, "CSG related system information and CSG subscription information", 3GPP TSG-RAN WG2 #60, R2-075133, Nov. 9, 2007.
Asustek, "Mobility Information and Cell (re)selection," Discussion & Decision, 3GPP TSG-RAN WG2 #60 Nov. 5-9, 2007, Jeju, Korea, R2-075135, pp. 1-8.
Ericsson, "Idle state access restriction for CSGs", 3GPP TSG-RAN WG2 #60, Tdoc R2-&ItURL:http://www.3gpp.org/ftp/tsg_ran/WG2_RL2/TSGR2_60/Docs/R2-074684.zip>.
Ericsson: "Idle state access restriction for home eNB", R2-073415, 3GPP TSG-RAN WG2#59, Aug. 24, 2007.
"Evolved Universal Terrestrial Radio Access (E-UTRA) and Evolved Universal Terrestrial Radio Access (E-UTRAN); Overall description; Stage 2 (3GPP TS 36.300 version 8.4.0 Release 8); ETSI TS 136 300", ETSU Standards, LIS, Sophia Antipolis Cedex, France, vol. 3-R2, No. V8.4.0, Apr. 1, 2008, XP014041816, ISSN: 0000-0001 chapters: 10.1.1.2; 10.1.3; 10.1.3.2.
Huawei, "Detection of conflicting cell identities", 3GPP Draft; R2-074216, 3rd Generation Partnership Project (3GPP), Mobile Competence Centre ; 650, Route Des Lucioles; F-06921 Sophia-Antipolis Cedex; France, vol. RAN-WG2, No. Shanghai, China; 20071002, Oct. 2, 2007, XP050136835, pp. 1-3, [retrieved on Oct. 2, 2007].
NTT Docomo, et al., "Cell ID Assignment for Home Node B," 3GPP Draft; R2-073374, 3rd Generation Partnership Project (3GPP), Mobile Competence Centre; 650, Route Des Lucioles; F-06921 Sophia-Antipolis Cedex ; France, Athens, Grece, R2-073374, No. 59, Aug. 20, 2007, pp. 1-5, XP002541822 the whole document.
NTT Docomo, et al., "CSG with limited open access" 3GPP Draft; R2-075150 CSG With Limited Open Access, 3rd Generation Partnership Project (3GPP), Mobile Competence Centre ; 650, Route Des Lucioles ; F-06921 Sophia-Antipolis Cedex ; France, vol. RAN WG2, No. Jeju; 20071112, Nov. 12, 2007, XP050137597 [retrieved on Nov. 12, 2007] the whole document.
Panasonic, "CSG Cell Prioritization by UE", 3GPP TSG RAN WG2 #59 R2-073282, Aug. 20, 2007.
Taiwan Search Report—TW097144277—TIPO—Oct. 14, 2012.
Taiwan Search Report—TW097144277—TIPO—May 29, 2013.
T-Mobile, Report on email discussion "Home Cells (1)—General concepts & solutions for LTE", 3GPP TSG RAN2#60 R2-074904, Nov. 5, 2007.
TSG RAN WG2, "LS on Closed Subscriber Groups for LTE Home cells", 3GPP TSG-RAN WG2#58bis R2-072991, Release 8, Jun. 25, 2007.
Vodafone, "GERAN to LTE Handover: Home Cell Deployment Considerations", 3GPP Workshop GERAN/RAN, TDoc GR-070020, Sep. 28, 2007.
Vodafone Group: "Signalling on a CSG Cell" 3GPP Draft; R2-072831, 3rd Generation Partnership Project (3GPP), Mobile Competence Centre ; 650, Route Des Lucioles ; F-06921 Sophia-Antipolis Cedex ; France, vol. RAN WG2, No. Orlando, USA; 20070702, Jul. 2, 2007, XP050135608.
Nokia Corporation, "Simple CSG for REL8," 3GPP TSG-RAN WG2 Meeting #61bis R2-081735, Nokia Siemens Networks, Apr. 4, 2008, pp. 1-5.

* cited by examiner

CLASSIFYING ACCESS POINTS USING PILOT IDENTIFIERS

CROSS-REFERENCE TO RELATED APPLICATIONS

This application claims the benefit of U.S. Provisional Patent application Ser. No. 60/988,631 entitled "APPARATUS AND METHOD TO FACILITATE IDLE STATE HANDOFF IN SYSTEMS WITH RESTRICTED ASSOCIATION" which was filed Nov. 16, 2007, U.S. Provisional Patent application Ser. No. 60/988,641 entitled "APPARATUS AND METHOD TO FACILITATE CONNECTED STATE HANDOFF IN SYSTEMS WITH RESTRICTED ASSOCIATION" which was filed Nov. 16, 2007, U.S. Provisional Patent application Ser. No. 60/988,649 entitled "APPARATUS AND METHOD TO FACILITATE MANAGEMENT AND ADVERTISEMENT OF NEIGHBOR LISTS IN SYSTEMS WITH RESTRICTED ASSOCIATION" which was filed Nov. 16, 2007, and U.S. Provisional Patent application Ser. No. 61/025,093 entitled "SYSTEMS AND METHODS FOR SIGNALING RESTRICTED ASSOCIATION" which was filed Jan. 31, 2008. The entireties of the aforementioned applications are herein incorporated by reference.

In addition, this application is related co-pending U.S. patent applications "UTILIZING RESTRICTION CODES IN WIRELESS ACCESS POINT CONNECTION ATTEMPTS" by Gavin Horn, et al. having Ser. No. 12/269,611, "FAVORING ACCESS POINTS IN WIRELESS COMMUNICATIONS" by Gavin Horn, et al. having Ser. No. 12/269,619, "UTILIZING BROADCAST SIGNALS TO CONVEY RESTRICTED ASSOCIATION INFORMATION" by Gavin Horn, et al. having Ser. No. 12/269,637, and "SECTOR IDENTIFICATION USING SECTOR PARAMETERS SIGNATURES" by Gavin Horn, et al. having Ser. No. 12/269,654, all of which are filed concurrently herewith, assigned to the assignee hereof, and expressly incorporated by reference herein.

BACKGROUND

I. Field

The following description relates generally to wireless communications, and more particularly to utilizing pilot identifiers to identify access point types.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. As mobile devices move throughout service areas, cells utilized for communication by the devices can be reselected between one or more access points (e.g., macrocells, femtocells, etc.). This can occur, for example, where an available access point, or serving cell thereof, can offer a better signal or service than a current access point. The mobile devices can measure parameters related to one or more cells, such as signal quality, service level, etc. and rank the cells according to desirability, which can be based on one or more of the parameters. In one example, the available access point can relate to a home access point for a given mobile device offering desirable billing, coverage, service options, etc. Accordingly, cells utilized for communication can be reselected to the more desirable access point when within a specified range.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating identifying access point types and/or related groups using pilot signals transmitted by the access points. For example, the pilot signals can comprise pilot identifiers utilized to identify the access points in wireless networks. A space of pilot identifiers can be divided to indicate one or more types or classifications related to the access points, and access points can select pilot identifiers from the appropriate group to indicate the type and/or classification. In one example, macrocells can select pilot identifiers from a disparate group or range than femtocells; further, restricted association femtocells can select pilot identifiers from a disparate group or range than those not implementing restricted association. Mobile devices can efficiently identify the type based at least in part on the pilot identifiers. It is to be appreciated that the space of pilot identifiers can be divided based on power, location, utilized frequency, transmission periodicity, network plan, service provider, owner of the access point, and/or substantially any parameters related to classifying access points.

According to related aspects, a method for determining cell information for cell reselection in a wireless communication network is provided. The method can include receiving a pilot signal broadcast from an access point and determining a pilot identifier comprised within the pilot signal. The method can further include determining a type of the access point based at least in part on an identifier range in which the pilot identifier falls.

Another aspect relates to a wireless communications apparatus. The wireless communications apparatus can include at least one processor configured to receive a pilot signal broadcasted from an access point and obtain a pilot identifier comprised within the pilot signal that uniquely identifies the access point. The processor is further configured to detect a type of the access point based at least in part on associating the pilot identifier with a range of identifiers. The wireless communications apparatus also comprises a memory coupled to the at least one processor.

Yet another aspect relates to a wireless communications apparatus that facilitates determining information related to an access point in a wireless network. The wireless communications apparatus can comprise means for receiving a pilot signal from an access point and means for receiving a pilot identifier comprised within the pilot signal. The wireless communications apparatus can additionally include means for determining a type of the access point based at least in part on the pilot identifier.

Still another aspect relates to a computer program product, which can have a computer-readable medium including code for causing at least one computer to receive a pilot signal broadcast from an access point. The computer-readable medium can also comprise code for causing the at least one computer to determine a pilot identifier comprised within the pilot signal. Moreover, the computer-readable medium can comprise code for causing the at least one computer to determine a type of the access point based at least in part on an identifier range in which the pilot identifier falls.

Moreover, an additional aspect relates to an apparatus. The apparatus can include a cell reselector that receives a plurality of pilot signals broadcast from a plurality of access points and a pilot identifier receiver that obtains a pilot identifier comprised within at least one of the plurality of pilot signals, the pilot identifier identifies at least one of the plurality of access points. The apparatus can further include an access point type determiner that detects a type of the at least one of the plurality of access points based at least in part on the pilot identifier.

According to additional related aspects, a method for selecting pilot identifiers for access points in a wireless communication network is provided. The method includes determining a type of an access point for communicating in a wireless communication network and determining a range of pilot identifiers related to the type of the access point. The method can further include selecting a pilot identifier from the range of pilot identifiers for subsequent transmission in a pilot signal over the wireless communication network for identifying the access point.

Another aspect relates to a wireless communications apparatus. The wireless communications apparatus can include at least one processor configured to detect a type of an access point for communicating in a wireless communication network and determine a range of pilot identifiers related to the type of the access point. The processor is further configured to select a pilot identifier from the range of pilot identifiers for subsequent transmission in a pilot signal over the wireless communication network for identifying the access point. The wireless communications apparatus also comprises a memory coupled to the at least one processor.

Yet another aspect relates to a wireless communications apparatus that facilitates indicating access point information in wireless communications. The wireless communications apparatus can comprise means for receiving a type of an access point for communicating in a wireless communication network and means for determining a range of pilot identifiers related to the type of the access point. The wireless communications apparatus can additionally include means for selecting a pilot identifier from the range of pilot identifiers for subsequent transmission in a pilot signal over the wireless communication network.

Still another aspect relates to a computer program product, which can have a computer-readable medium including code for causing at least one computer to determine a type of an access point for communicating in a wireless communication network. The computer-readable medium can also comprise code for causing the at least one computer to determine a range of pilot identifiers related to the type of the access point. Moreover, the computer-readable medium can comprise code for causing the at least one computer to select a pilot identifier from the range of pilot identifiers for subsequent transmission in a pilot signal over the wireless communication network for identifying the access point.

Moreover, an additional aspect relates to an apparatus. The apparatus can include an access point type specifier that determines a type of an access point for communicating in a wireless communication network. The apparatus can further include a pilot identifier selector that determines a range of pilot identifiers related to the type of the access point and selects a pilot identifier from the range of pilot identifiers for subsequent transmission in a pilot signal over the wireless communication network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
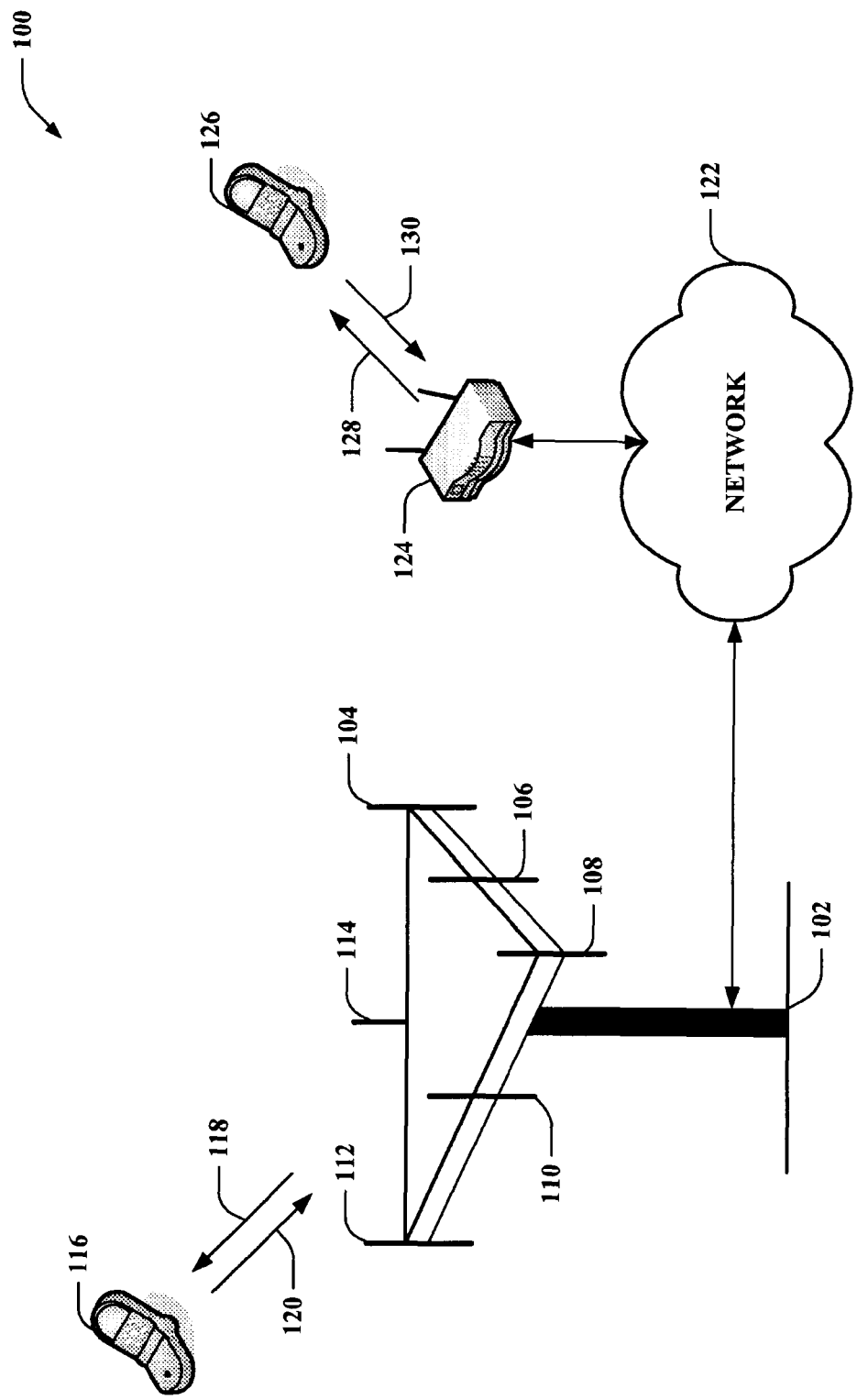
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, various tangible media capable of storing and/or containing instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3G network), over a backhaul link connection. The network 122 can store information regarding access parameters related to the mobile device 116 and 126 and other parameters of a wireless access network to provide service to the devices 116 an 126. Furthermore, a femtocell 124 can be provided to facilitate communicating with the mobile device 126 over forward link 128 and reverse link 130 (similarly to forward link 118 and reverse link 120, as described supra). The femtocell 124 can provide access to one or more mobile devices 126 much like the base station 102, but on a smaller scale. In one example, femtocell 124 can be configured in a residence, business, and/or other close range setting (e.g., theme park, stadium, apartment complex, etc.). The femtocell 124 can connect to the network 122 utilizing a backhaul link connection, which can be over a broadband Internet connection (T1/T3, digital subscriber line (DSL), cable, etc.), in one example. The network 122 can similarly provide access information for the mobile device 126. Moreover, the base station 102 and/or femtocell can be a stationary access point or a mobile access point (e.g., on a vehicle, such as a train, bus, airplane, car, etc.).

According to an example, mobile devices 116 and 126 can travel over service areas performing cell reselection among disparate base stations and/or femtocells during travel. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femtocell 124. In this regard, the mobile device 126 can have reselected one or more cells related to the femtocell 124 to receive more desirable wireless service access. In one example, the femtocell 124 can be a home access point for the mobile device 126 offering more desirable billing and/or other access options. In another example, the femtocell 124 can be related to a business or venue offering options or data tailored to the respective business or venue. Thus, mobile device 126 can reselect one or more cells related to the femtocell 124, in an idle and/or connected mode, to receive such tailored options. In addition, as mobile device 126 moves toward base station 102, it can reselect a cell related thereto, for a variety of reasons (e.g., to mitigate interference on the femtocell 124, to receive a more optimal signal or increased throughput, etc.).

In traveling over the service area, mobile devices 116 and/or 126 can continually measure available base stations (such as base station 102), femtocells (such as femtocell 124), and/or other access points, to determine when cell reselection is beneficial to the mobile devices 116 and/or 126. The measuring can include, for example, evaluating signal quality, throughput, services available, a wireless access provider related to the access point, and/or the like. Based on one or more of the measurements, the mobile devices 116 and/or 126 can rank access points for reselection. Upon determining the ranking, the mobile devices 116 and/or 126 can attempt cell reselection to the highest ranking access point. In addition, the mobile devices 116 and/or 126 can maintain a list of accessible access points and/or groups of accessible access points. The accessible access points can relate to, for example, restricted association access points that the mobile devices 116 and/or 126 are authorized to access and/or to which access is preferred or otherwise favorable over other access points.

In one example, the femtocell 124 can be such a restricted association access point. Restricted association access points, for example, can be restricted in some aspects where each access point provides certain services to certain mobile devices (e.g., mobile devices 116 and/or 126) but not necessarily to other mobile devices or access terminals (not shown). For example, the femtocell 124 can be restricted to not provide to the other mobile devices or access terminals registration, signaling, voice call, data access, and/or additional services. Restricted association access points can be deployed in an ad-hoc manner. For example, a given homeowner can install and configure a restricted access point for the home.

In one example, the mobile devices 116 and/or 126 can identify one or more available access points, such as base station 102, femtocell 124, and/or other access points, based at least in part on one or more indicators in a broadcast signal related to the access point(s). Upon receiving the one or more indicators, the mobile devices 116 and/or 126 can ensure the access point(s) is/are in the list, or that a related group identifier is in the list, before attempting cell reselection. In another example, the mobile devices 116 and/or 126 can verify association of the access point with the list before measuring the parameters for ranking. The accessible access points can relate to, for example, restricted association access points that the mobile devices 116 and/or 126 are authorized to access and/or to which access is preferred or otherwise favorable over other access points.

In one example, the femtocell 124 can be such a restricted association access point. Restricted association access points, for example, can be restricted in some aspects where each access point provides certain services to certain mobile devices (e.g., mobile devices 116 and/or 126) but not necessarily to other mobile devices or access terminals (not shown). For example, the femtocell 124 can be restricted to not provide to the other mobile devices or access terminals registration, signaling, voice call, data access, and/or additional services. Restricted association access points can be deployed in an ad-hoc manner. For example, a given homeowner can install and configure a restricted access point for the home.

The base station 102 and/or femtocell 124 can transmit pilot identifiers in pilot signals to identify themselves. According to an example, the base station 102 and/or femtocell 124 can select or be assigned pilot identifiers related to one or more related classifications or types. Thus, the base station 102, in one example, can be assigned a pilot identifier from a range or group separate from the femtocell 124. In this regard, mobile devices 116 and/or 126 can determine the related type or classification (e.g., macrocell or femtocell) based on the range or group of the pilot identifier. Using this information, the mobile devices 116 and/or 126 can determine whether to extract further information before attempting connection with the access point. Thus, where mobile device 116 initially moves into range of base station 102, it can attempt connection thereto upon determining it is a macrocell based on the pilot identifier without further inquiry.

According to another example, where mobile device 126 initially moves into range of femtocell 124, it can determine from the pilot identifier that it is a femtocell and can further evaluate the femtocell 124, and/or one or more received signals related to the femtocell 124, for a sector identifier, restricted association identifier, group identifier, and/or other identifier. Upon receiving such, the mobile device 126 can ensure the femtocell 124, or related restricted association or group identifier, is in a maintained list of accessible access points before attempting connection establishment with the femtocell 124, for example. In another example, the pilot identifier can further be selected or assigned to the femtocell 124 based on whether or not it implements restricted association, and/or to what degree it implements restricted association, and/or the like. In this regard, the mobile device 126 can further determine whether to request connection with the femtocell 124 without necessarily needing to further evaluate the femtocell 124. It is to be appreciated that the pilot identifiers can be divided according to additional factors, such as geographical or relative location of the access point, transmission frequency ranges, power, and/or periodicities utilized by the access point, whether the backhaul associated with the access point is secure or insecure (and/or a level of the security), whether the access point is mobile or stationary, service providers or owners (or types thereof) of the access point, etc.

Figure 2:
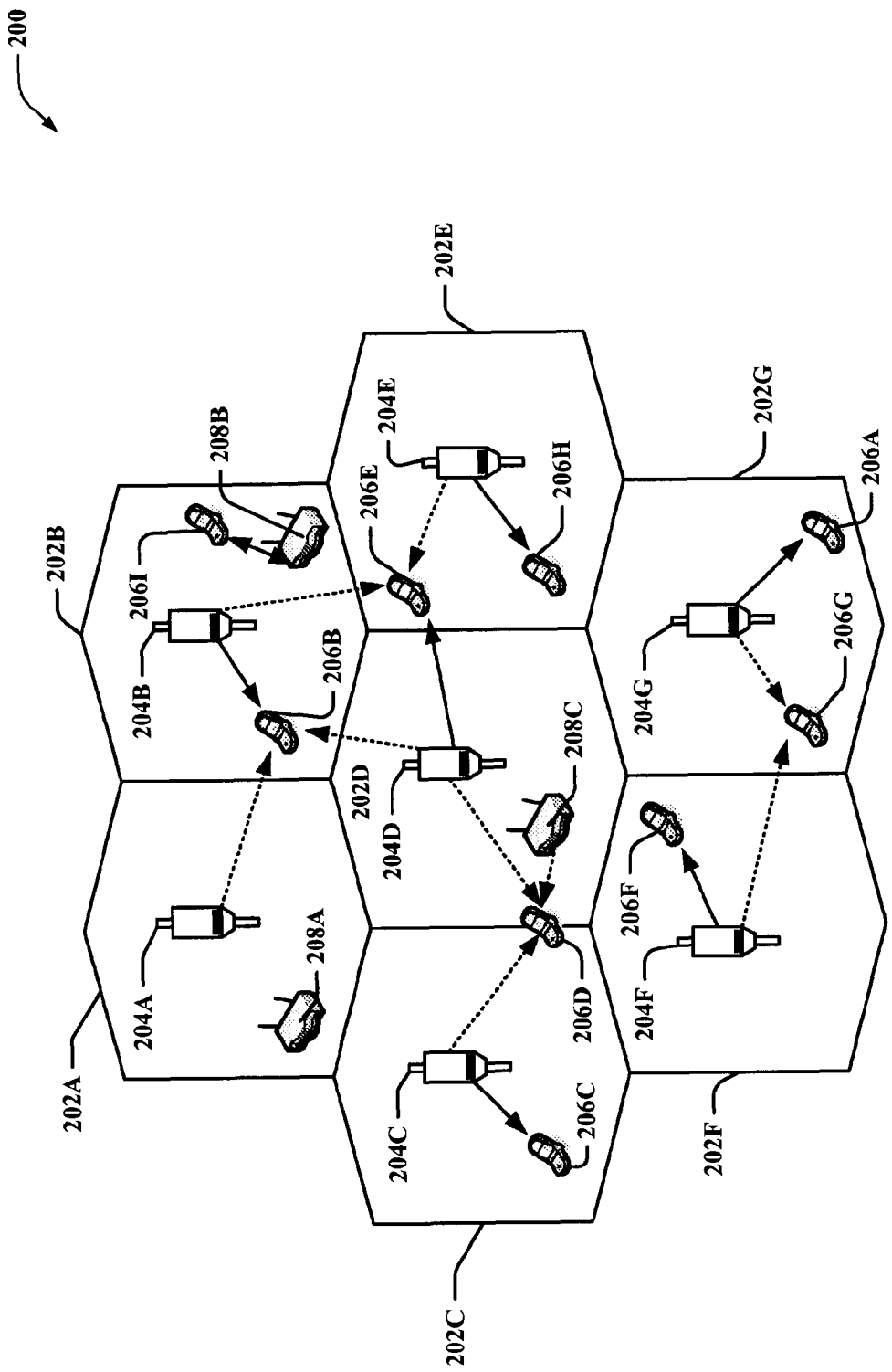
FIG. 2 is an illustration of a wireless communication network that facilitates cell reselection.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocells, offering services related to a particular service location, as described. The mobile devices 206A-206I can additionally communicate with these smaller scale access points 208A-208C to receive offered services. The wireless communication system 200 can provide service over a large geographic region, in one example (e.g., macrocells 202A-202G can cover a few blocks in a neighborhood, and the femtocell access points 208A-208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. In one example, the one or more of the mobile devices 206A-206I can be associated with a home femtocell related to at least one of femtocell access points 208A-208C. For example, mobile device 206I can be associated with femtocell access point 208B as its home femtocell. Thus, though mobile device 206I is in macrocell 202B, and thus in coverage area of access point 204B, it can communicate with the femtocell access point 208B instead of (or in addition to) access point 204B. In one example, the femtocell access point 208B can provide additional services to the mobile device 206I, such as desirable billing or charges, minute usage, enhanced services (e.g., faster broadband access, media services, etc.). Thus, when the mobile device 206I is in range of the femtocell access point 208B, it can be reined in to communicate therewith by favoring the femtocell access point 208B in reselection.

For example, mobile device 206D can be associated with femtocell access point 208C. As the mobile device 206D moves from macrocell 202C into 202D and closer to access points 204D and/or 208C, it can begin the cell reselection process, as described herein. This can include, for example, measuring surrounding cell parameters (e.g., related to access points 204C, 204D, and 208C) to determine a desirable connection. The parameters can relate to, for example, signal quality, connection throughput, services offered, a service provider related to the access point, and/or the like. Prior or subsequent to measuring such parameters, the mobile device 206D can receive pilot signals, comprising pilot identifiers, related to access points 204C, 204D, and/or 208C, for example. Utilizing the pilot identifiers, the mobile device 206D can determine whether additional information regarding the access points is required. As mentioned, in one example, the access points can select or be assigned (e.g., from the wireless network) pilot identifiers in a range or group related to an access point type or classification. Thus, for instance, the mobile device 206D can determine that the access points 204C and 204D are macrocells whereas the access point 208C is a femtocell.

In another example, the femtocell access point 208C can further select or be assigned a pilot identifier from a range or group that specifies whether the femtocell access points 208C implements restricted association and/or to what extent. Furthermore, the pilot identifier range or group utilized can be associated with a service provider or other entity related to the femtocell access point 208C allowing the mobile device 206D to efficiently identify information regarding the femtocell access point 208C and/or whether to request connection with the femtocell access point 208C. It is to be appreciated that the mobile device 206D can request connection establishment with the access points 204C or 204D based on their respective pilot identifiers being in the macrocell group or range, in one example.

Where the pilot identifier indicates that the access point is in a range or group for which the mobile device 206D requires additional information, the mobile device 206D, in one example, can verify an identifier of the access point as present in a list of accessible access points, as described. The list can additionally or alternatively identify groups of access points where a group identifier of the access point can be verified with group identifiers in the list. In the foregoing example, the mobile device 206D can measure parameters for access points 204C, 204D, and 208C and rank the cells to determine whether to perform cell reselection from access point 204C to one of the others if their rank is higher. As in the previous example, where femtocell access point 208C relates to a home femtocell of the mobile device 206D (as identified at least in part by the pilot identifier as described), it can favor it for reselection (e.g., by evaluating an added parameter offset to increase its value and/or hysteresis to decrease parameter values of other access points, for example). If one or more of the disparate access points 204D and/or 208C rank higher than the access point 204C, mobile device 206D can reselect cells related to the disparate access point 204D or 208C.

In one example, one or more of the disparate access points 204D and/or 208C can implement restricted association where some mobile devices cannot connect thereto, and/or the access points 204D and/or 208C can restrict certain mobile devices with respect to providing signaling, data access, registration, service, and/or the like. This can be based at least in part on a service provider of the mobile device and the restricted associated access point, for example. In another example, the restricted association access point can relate to certain mobile devices, such as a corporate access point restricting access only to corporate issued mobile devices. Thus, if the mobile device 206D cannot reselect cells related to one or more of the disparate access points 204D and/or 208C due to restricted association, it can attempt cell reselection with one or more of the other ranked access points until it finds an access point to which it can connect. The determination of whether the mobile device 206D can reselect cells related to the access points can be based at least in part on relating the pilot identifier with a group or range indicative of an access point classification, for example.

Furthermore, as described, the mobile devices 206A-206I can maintain a list of accessible access points and/or groups thereof. In one example, the list can include only certain types of access points (such as femtocells) since other types of access points (such as macrocells) can be accessible from substantially any mobile device. The list of accessible access points and/or groups can be originally populated, for example, by one or more access points in communication with the mobile device 206A-206I, which can retrieve the information from an underlying wireless network as described. As the mobile devices 206A-206I move throughout the coverage area of the wireless system 200 and reselect cells as described, they can initially evaluate a pilot identifier of access points related to the cells to determine whether further inquiry is desired or required before selecting a cell for reselection.

If the pilot identifier for a given cell or related access point is of a range or group indicating that the cell or access point may implement restricted association, the mobile devices 206A-206I can first verify the cell or access point (or related group) as being present in the list where relevant. In one example, if the mobile devices 206A-206I determine one or more femtocell access points 208A-208C to be the highest ranked cell based on measurements as described, it can verify that the respective femtocell access point is in the list where the pilot identifiers for the femtocell access points 208A-208C indicate that they may implement restricted association and/or to what degree they implement restricted association. If not in the list, the mobile devices 206A-206I can decide not to attempt access to the femtocell access point and can attempt connection with the next highest ranked access point and/or attempt to locate another access point on a disparate frequency. It is to be appreciated that in an alternative example, a list of inaccessible cells and/or groups can be maintained where the mobile devices 206A-206I do not attempt connection with cells in the list.

Figure 3:
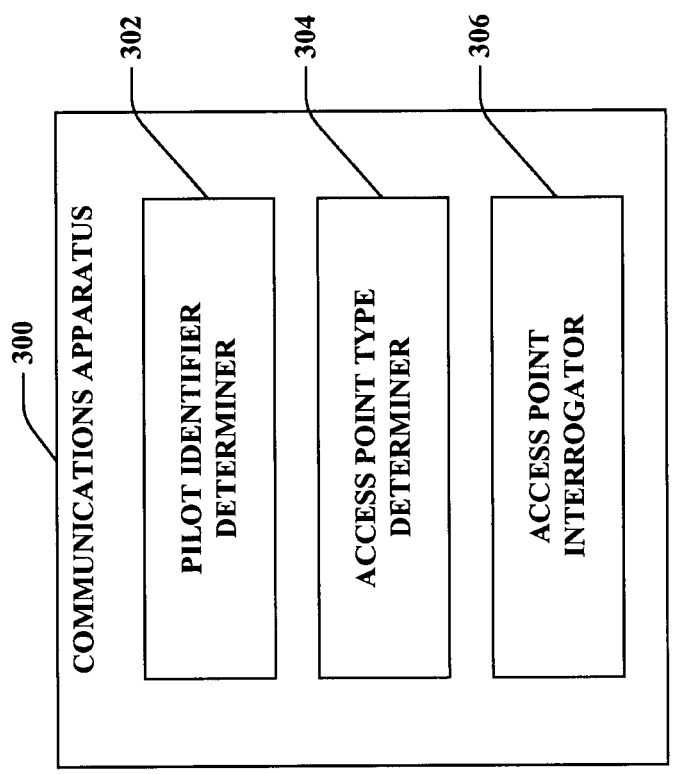
FIG. 3 is an illustration of an example communications apparatus for employment within a wireless communications environment.

Turning to FIG. 3, illustrated is a communications apparatus 300 for employment within a wireless communications environment. The communications apparatus 300 can be a base station or a portion thereof, a mobile device or a portion thereof, or substantially any communications apparatus that receives data transmitted in a wireless communications environment. The communications apparatus 300 can include a pilot identifier determiner 302 that can receive a pilot identifier from one or more access points (not shown) via a pilot signal, an access point type determiner 304 that can discern a type of the access point based at least in part on the pilot identifier, and an access point interrogator 306 that can request or determine additional information regarding the access point based at least in part on the determined type. For example, the pilot identifier space can be partitioned into various ranges or groups to indicate classification or type of an access point; access points select or are assigned pilot identifiers from the group or range related to their classification or type.

According to an example, the pilot identifier determiner 302 can receive a pilot identifier related to one or more access points. The pilot identifiers can be received in one or more pilot signals and/or over a pilot signal channel in a wireless communication network. The pilot identifier determiner 302 can extract the pilot identifier from the pilot signal, in one example. Utilizing the pilot identifier, the access point type determiner 304 can detect a type or classification of the access point according to a range of the pilot identifier and/or a presence within a grouping of pilot identifiers. The communications apparatus 300 can determine the grouping of identifiers from various sources, including hard-coding the grouping in the apparatus 300, receiving the grouping upon establishing communication with a related wireless network, receiving the grouping from one or more access points or disparate apparatuses, and/or the like. For example, pilot identifiers for femtocells can be of a different range than those for macrocells. Further, restricted association femtocells can have pilot identifiers of a different range than non-restricted association femtocells. Moreover, as described, the pilot identifier can indicate an extent to which restricted association is implemented (e.g., with respect to service, registration, signaling, etc.).

In addition, the access point type determiner 304 can determine location, frequency ranges utilized, periodicities utilized for transmission, transmission power, whether the access point communicates over a secure or insecure backhaul, whether the access point is a mobile or stationary access point, and/or other communication parameters related to the access point based at least in part on the range of the pilot identifier and/or an associated group. Based on the determined type, the access point interrogator 306 can request and/or receive additional information from the access point. For example, where the access point type determiner 304 determines that the access point implements restricted association, the access point interrogator 306 can request or determine an identifier related to the access point and/or a group related thereto. Using this identifier, the communications apparatus 300 can determine whether to request connection establishment with the access point. In one example, the communications apparatus 300 can verify presence of the identifier in a list of accessible access points or groups, as described above. It is to be appreciated that additional information can be requested and/or utilized to determine a subsequent action with respect to the access point.

Figure 4:
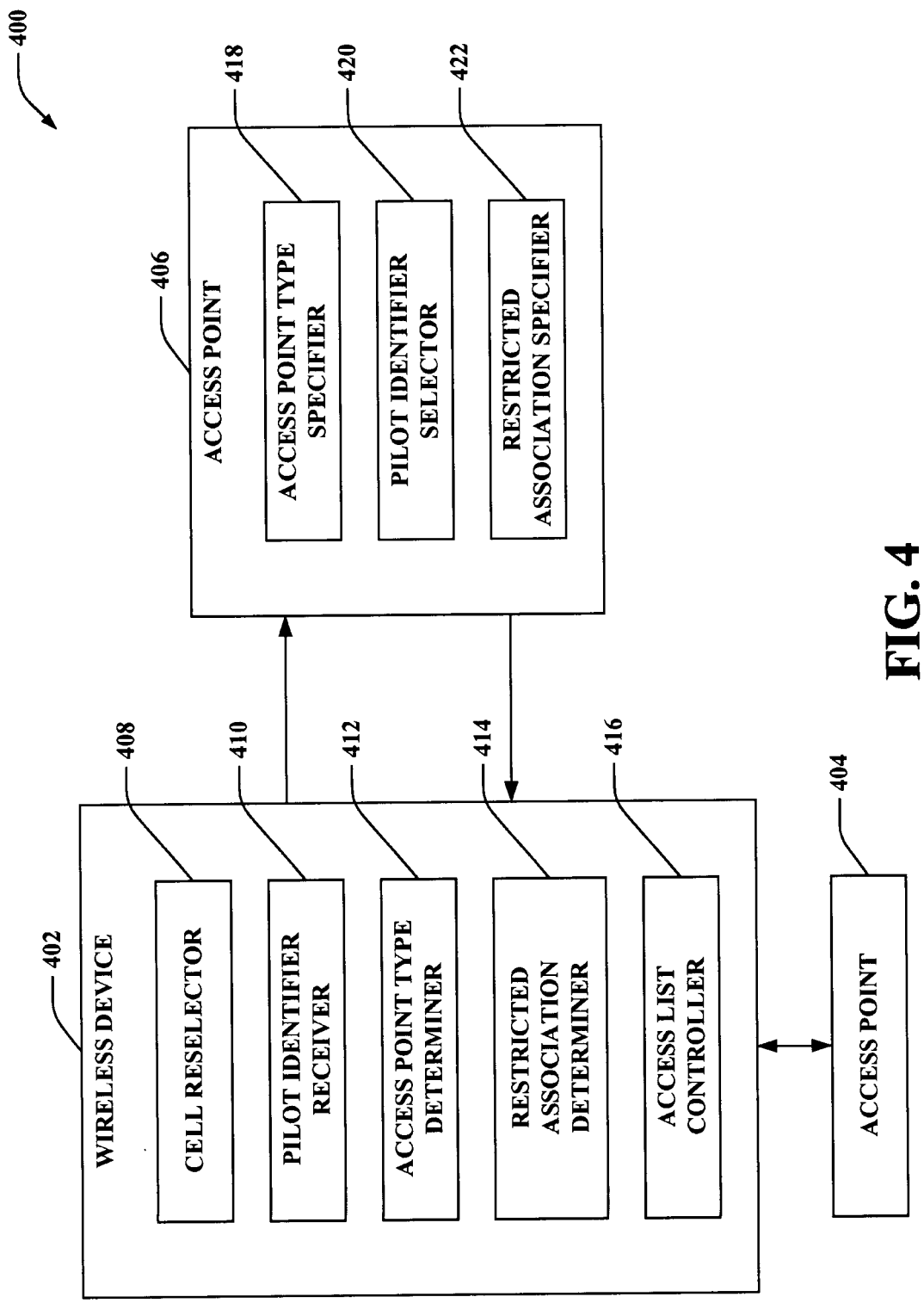
FIG. 4 is an illustration of an example wireless communications system that effectuates determining access point types and/or classifications using pilot identifiers.

Now referring to FIG. 4, illustrated is a wireless communications system 400 that utilizes pilot identifiers to classify access points. The wireless device 402 and/or access points 404 and/or 406 can be a base station, femtocell, mobile device, or portion thereof. In one example, wireless device 402 can transmit information to access points 404 and/or 406 over a reverse link or uplink channel; further wireless device 402 can receive information from access points 404 and/or 406 over a forward link or downlink channel. Moreover, system 400 can be a MIMO system. Also, the components and functionalities shown and described below in the wireless device 402 can be present in the access points 404 and/or 406 as well and vice versa, in one example; the configuration depicted excludes these components for ease of explanation.

Wireless device 402 includes a cell reselector 408 that can measure surrounding cell parameters and rank the cells for reselecting one or more of the cells to receive wireless communications, a pilot identifier receiver 410 that can obtain a pilot identifier (e.g., from a pilot signal) related to an access point, an access point type determiner 412 that can determine a type of the access point based at least in part on the pilot identifier, a restricted association determiner 414 that can receive a restricted association status of the access point based on the determined type, and an access list controller 416 that can maintain a list of accessible access points, preferred access points, related groups of access points, and/or the like. In one example, the list of access points can relate to individual or groups of access points that implement restricted association that the wireless device 402 can access. Thus, upon determining an identifier of a restricted association access point, the identifier can be verified in the list before attempting connection establishment, for example.

The access point 406 includes an access point type specifier 418 that can determine a type of the access point 406, a pilot identifier selector 420 that can select and/or be assigned a pilot identifier from a group related to the determined type, and a restricted association specifier 422 that can specify whether the access point 406 implements restricted association and/or to what extent it implements such, as described. It is to be appreciated that the restricted association specifier 422 need not be included in types of access points that do not implement restricted association (e.g. macrocells). In an example, the pilot identifier selector 420 can select and/or be assigned the pilot identifier based on a type, location, transmission power, transmission periodicity, transmission frequency range, security measure, mobility, and/or other communication parameters of the access point 406. In this regard, a receiver of the identifier can efficiently determine relevant information regarding the access point 406 from the pilot identifier, as described.

According to an example, as described, the wireless device 402 can participate in a wireless communications system traveling around the system and receiving wireless service access from one or more disparate access points, such as access point 404 and/or 406. The access points 404 and/or 406 can provide broad area coverage, such as a base station implementing one or more macrocells, and/or more localized or specific coverage, such as a femtocell configured in a residence, office building, venue, etc., as described. The cell reselector 408 can reselect cells between access points for communication therewith, as described, when coming into range of a new access point, such as access point 406 and out of range of a current access point 404. This can be determined by evaluating parameters relating to the access points 404 and 406 such that the determination can be based on multiple parameters (not just signal strength, for example, but also access point type, services offered, available throughput, whether it is a home access point for the wireless device 402, etc., as described). In this regard, the wireless device 402 supports seamless communications while traveling throughout the wireless network.

According to an example, the wireless device 402 can be communicating with access point 404 to receive wireless communication services. The wireless device 402, as described, can be mobile, and the cell reselector 408 can evaluate surrounding cells to determine when cell reselection is appropriate to continue the wireless communication services. This can occur, for example, where the wireless device 402 moves in range of an access point improving signal quality thereof while moving away from the connected access point 404 experiencing a degradation in its signal quality. In this regard, the cell reselector 408 can measure surrounding cell parameters and rank the cells according to the parameters. When the current access point 404 falls from the top of the ranked list, in one example, the wireless device 402 can begin cell reselection to the top ranked access point.

Prior or subsequent to ranking the access points, the wireless device 402 can efficiently identify information regarding the access points to facilitate subsequent action. For example, the access point 406 can transmit a pilot signal that can be evaluated by the wireless device 402. In one example, the access point type specifier 418 can determine one or more types or classifications related to the access point 406. The pilot identifier selector 420 can then select or be assigned (e.g. from a wireless network) a pilot identifier from a grouping or range related to the determined type or classification. For example, macrocells can utilize a portion of a pilot identifier space, femtocells can use another portion, cell relay can use yet another portion, mobile cell can utilize a portion, etc. Additionally or alternatively, types within the foregoing groups can be further classified to groups or ranges of identifiers. For example, restricted association can utilize a different group within a femtocell group than non-restricted, groups can be defined based on multiple levels of implemented restricted association, broad coverage can utilize a disparate group than local coverage, mobile access points can utilize a different group from stationary access points, groupings can be based on transmission power, frequency, periodicity, location, security, service provider or owner of the access point, and/or the like.

The access point 406 can transmit the pilot identifier to the wireless device 402 over a pilot signal channel and/or the like. The wireless device 402, as described, can receive the pilot signal as part of a cell reselection initiated by the cell reselector 408, in one example. The pilot identifier receiver 410 can determine a pilot identifier from a pilot signal, which can be received over the pilot signal channel in one example. The access point type determiner 412 can detect a type of the access point 406 based on the pilot identifier. As described, the access point type determiner 412 can evaluate a group or range in which the pilot identifier falls to efficiently determine a classification or type thereof. For example, if the pilot identifier falls within the macrocell group, the access point type determiner detects the access point 406 as a macrocell access point and can accordingly request connection establishment without other prerequisite actions, for example. Where the pilot identifier falls within a range reserved for femtocells, the access point type determiner 412 recognizes the access point 406 as a femtocell, and the restricted association determiner 414 can further interrogate the access points 406, or one or more related signals, to determine a restricted association identifier. In this regard, the restricted association specifier 422 can include a restricted association identifier in one or more broadcast signals, such as a beacon, pilot, etc., and/or in response to a request, for example. The access list controller 416 can verify the restricted association identifier as present in a list of accessible access point or related group identifiers, for example. In addition, the cell reselector 408 can determine a sector identifier related to the access point 406 (e.g., from a beacon or pilot signal, based on a response to a request, etc.) based on the access point type determiner 412 detecting the access point 406 type as a femtocell and/or a femtocell implementing restricted association, in one example.

In addition, as described, the pilot identifier can be selected and/or be assigned to the access point 406 to indicate one or more disparate aspects. Thus, for example, during ranking for cell reselection, the access point type determiner 412 can determine additional aspects of the access point 406 related to the specified pilot identifier. For example, the pilot identifier can be in a group reserved according to a location of the access point 406; thus, the access point type determiner 412 can determine a location of the access point 406, which can be considered in cell reselection regarding the access point 406. Similarly, the pilot identifier can be in a group reserved for access points implementing certain protocols, frequencies, periodicities, security levels, service providers, access point owners, types of owners (e.g., commercial, governmental, personal, educational), types of access points (e.g., mobile, stationary, etc.) and/or the like. This information can be efficiently determined by the access point type determiner 412 and utilized in cell reselection by the cell reselector 408. In addition, as described, the pilot identifier can additionally be in a group reserved based on restricted association parameters, such as whether the access point 406 implements restricted association and also to what extent (e.g., signaling, service, registration, etc.).

Figure 5:
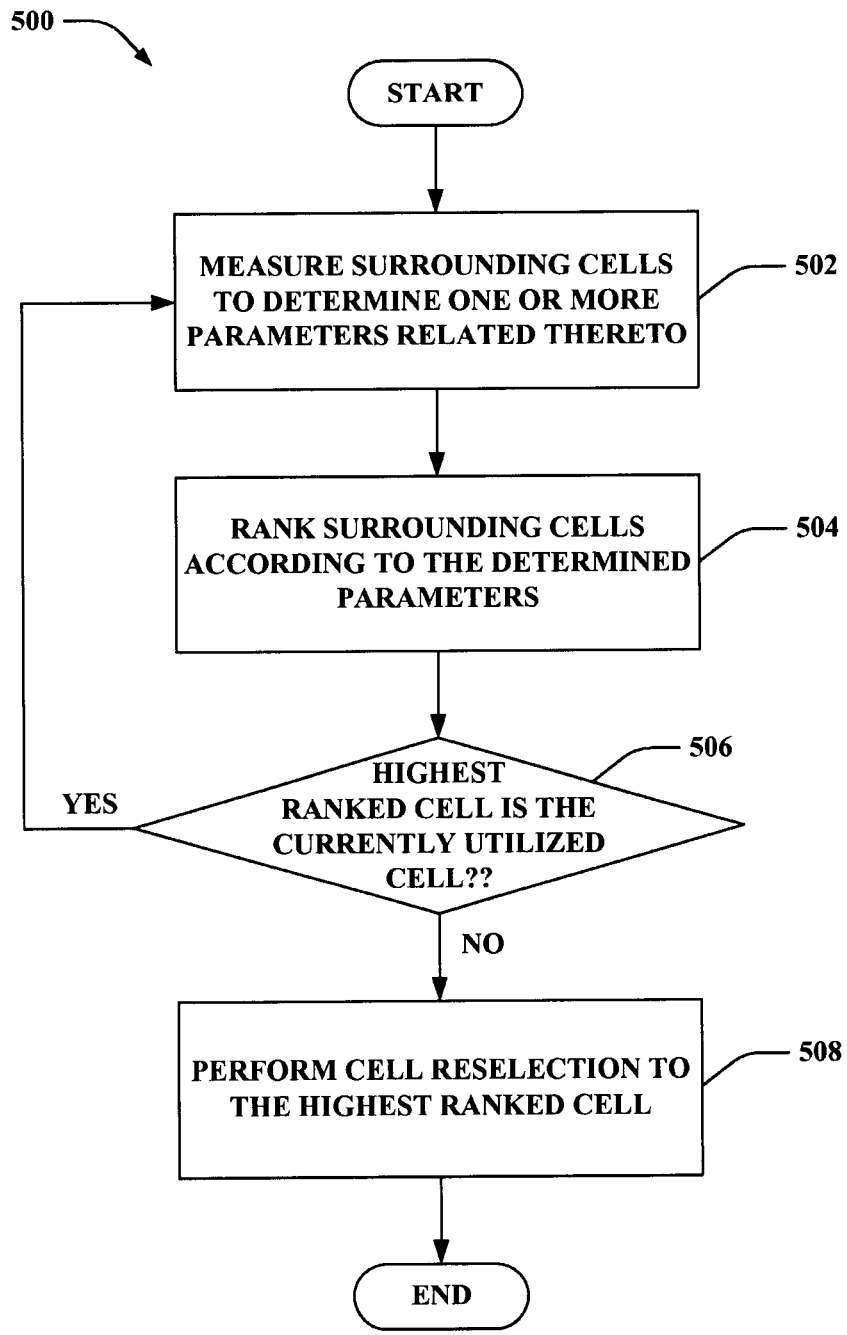
FIG. 5 is an illustration of an example methodology that facilitates performing cell reselection in wireless networks.
Figure 6:
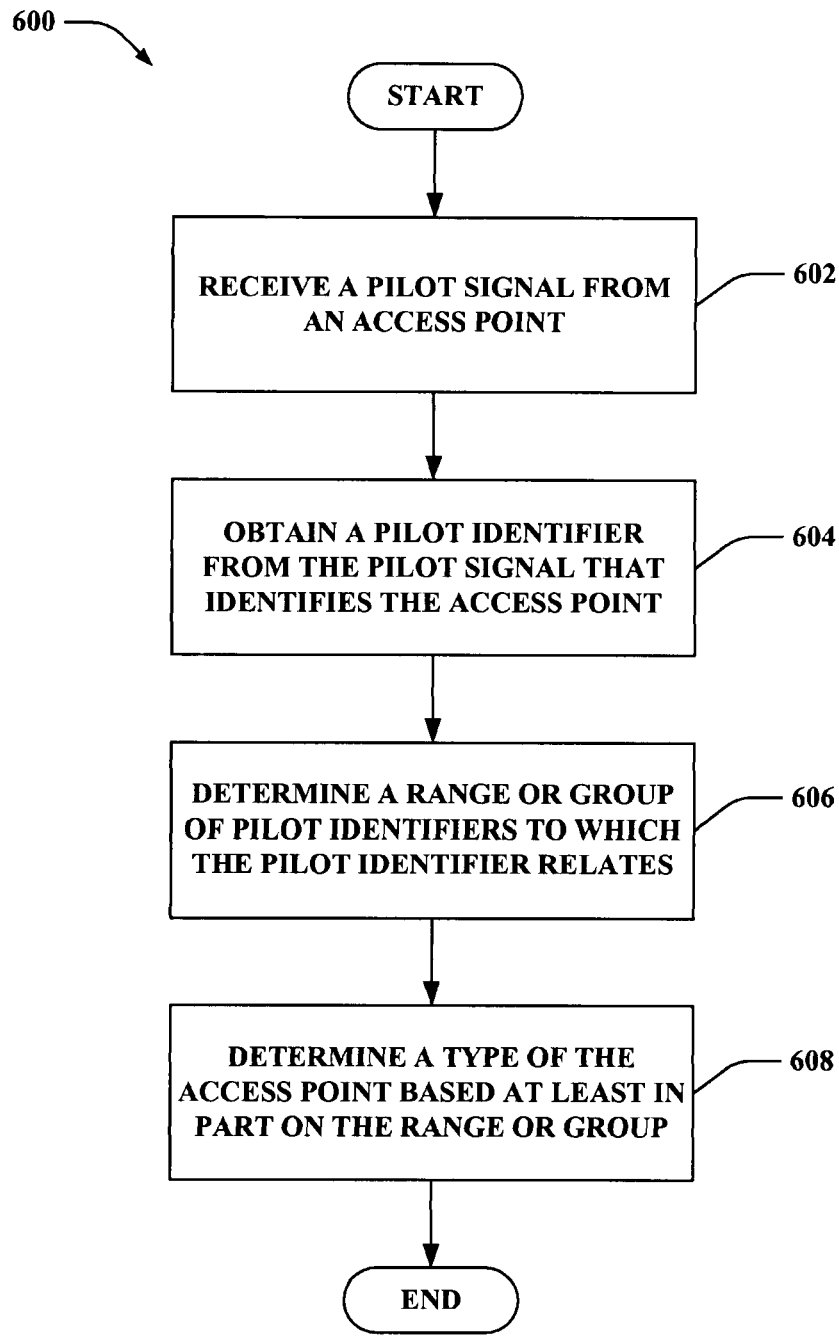
FIG. 6 is an illustration of an example methodology that facilitates determining a type of an access point based on a related pilot identifier.
Figure 7:
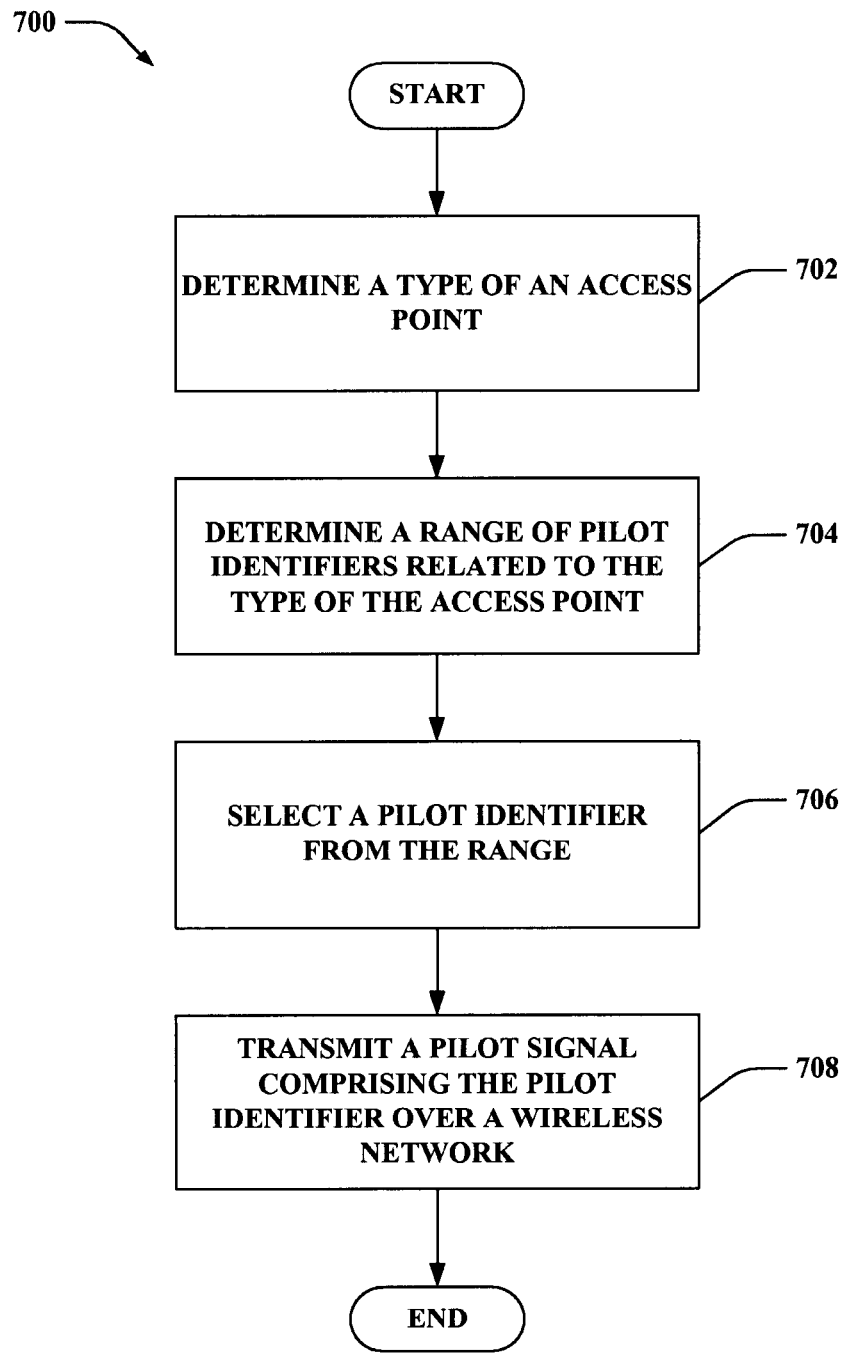
FIG. 7 is an illustration of an example methodology that facilitates specifying a type of an access point utilizing a selected pilot identifier.

Referring to FIGS. 5-7, methodologies relating to cell reselection and utilizing pilot identifiers to efficiently indicate types and/or classifications related to access points are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates cell reselection in wireless communications is displayed. At 502, surrounding cells are measured to determine one or more parameters related thereto. As described, the parameters can relate to communication metrics, such as signal strength, throughput, etc. and/or one or more additional considerations, such as an access point identifier, a group identifier, services offered, a related access provider, etc. In addition, the parameters can relate to the cell being provided by a home access point, which provides enhanced billing aspects, additional service or speeds, and/or the like. The parameters can also relate to offsets or hysteresis to increase consideration of desirable access points (such as a home access point, for example) and/or decrease consideration of other access points. At 504, the surrounding cells can be ranked according to the determined parameters. The ranking can indicate an order of desirable cells from which to receive wireless communication services.

At 506, it can be determined whether the highest ranked cell is that currently utilized. Such a determination can be utilized to ensure connection with an optimal access point. If the highest ranked cell is the cell currently utilized to receive wireless communications, the method proceeds back to step 502 to again measure surrounding cells. This can be based on a timer, in one example, as to not flood the network with cell measurements or spend resources by constantly measuring the cells. If the highest ranked cell is not the currently utilized cell, at 508, cell reselection can be performed, as described herein, to reselect the highest ranked cell. It is to be appreciated, in one example, that once reselection is complete, the method, in one example, can proceed back to step 502 to continue measuring surrounding cells. As described, the access points can be base stations, femtocells, and/or the like.

Turning to FIG. 6, illustrated is a methodology 600 that determines access point types based on pilot identifiers related thereto. At 602, a pilot signal can be received from an access point. As described, the signal can be received over a pilot signal channel and can be transmitted to identify one or more aspects related to the access point. At 604, a pilot identifier is obtained from the pilot signal that identifies the access point. The pilot identifier, for example, can be comprised within the pilot signal. Thus, the identifier can be extracted or otherwise obtained. At 606, a range or group of pilot identifiers to which the pilot identifier relates can be determined. As described, the range or group can relate to a classification or type of the access point, such as whether the access point is a femtocell or macrocell, stationary or mobile, a location of the access point, a transmission power, band, or periodicity utilized, security aspects of the access point, etc. Thus, at 608, a type of the access point can be determined based at least in part on the range or group. It is to be appreciated that this information can be subsequently utilized to take one or more subsequent actions with respect to the access point based on the determined type or classification, as described.

Turning to FIG. 7, illustrated is a methodology 700 that selects and transmits a pilot identifier based on a type of an access point. At 702, a type of an access point can be determined. The type, for example, can relate to whether the access point is a macrocell or femtocell, whether it implements restricted association, and/or one or more additional parameters as described supra. At 704, a range of pilot identifiers related to the type of the access point can be determined. Thus, for example, pilot identifiers can be selected from ranges related to one or more aspects of the access point as described. At 706, a pilot identifier can be selected from the determined range. In another example, the pilot identifier can be assigned from the range. At 708, a pilot signal comprising the pilot identifier can be transmitted over a wireless network. Thus, devices receiving the pilot signal can efficiently identify one or more aspects of the access point based on the pilot identifier, as described.

It will be appreciated that, in accordance with one or more aspects described herein, inferences can be made regarding many aspects of cell reselection, such as measuring the parameters, ranking the cells according to the parameters (and/or additional parameters), and even aspects of actual reselection (such as when to perform the reselection, etc.) as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can additionally be made in determining types and/or classifications of an access point for determining a group of identifiers from which to select to pilot identifier.

Figure 8:
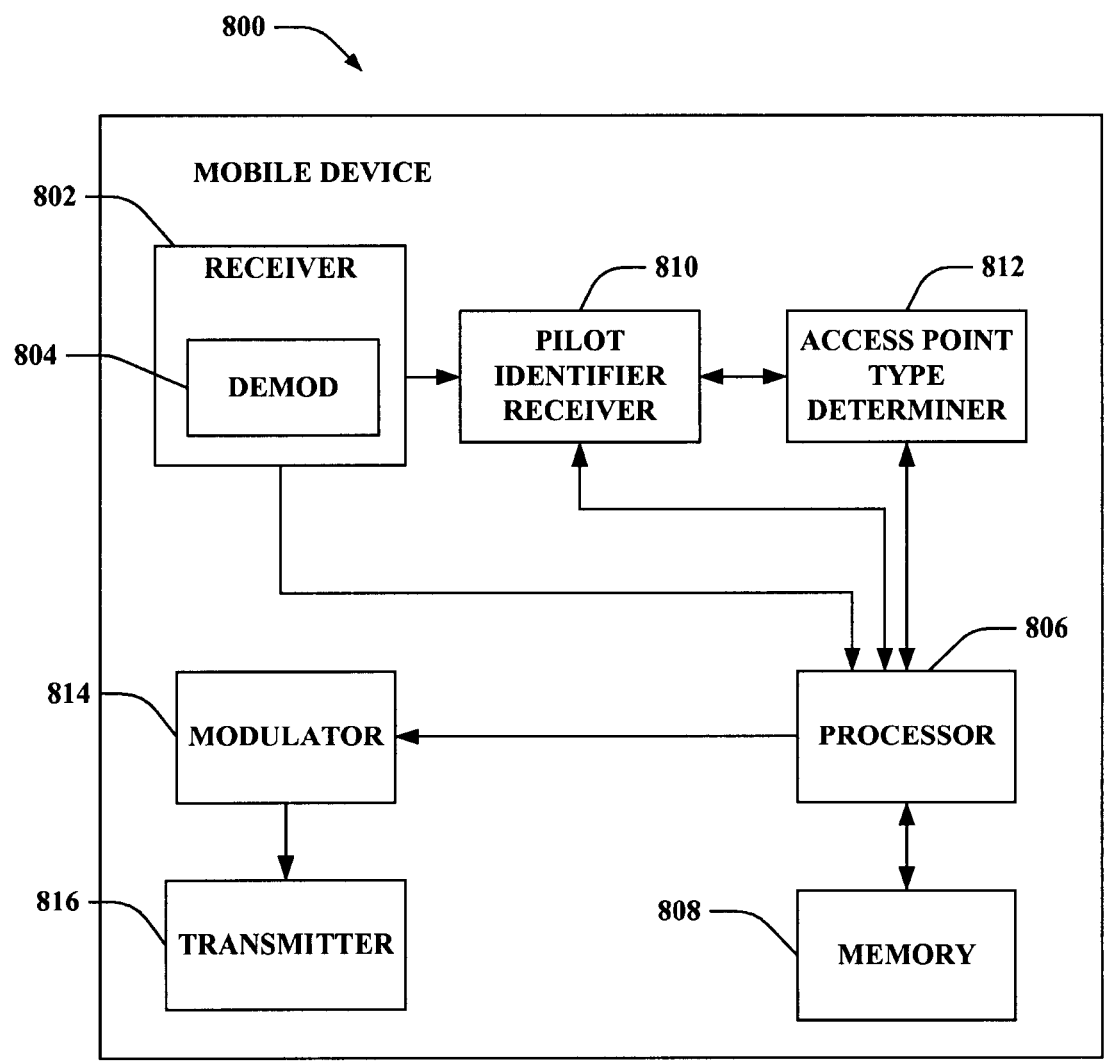
FIG. 8 is an illustration of an example mobile device that facilitates determining an access point type utilizing received pilot identifiers.

FIG. 8 is an illustration of a mobile device 800 that facilitates determining access point types and/or classifications based at least in part on pilot identifiers related to the access points. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 and/or receiver 802 can further be operatively coupled to a pilot identifier receiver 810 that receives a pilot identifier from one or more access points. As described, the pilot identifier can be comprised in a received pilot signal. The processor 806 is further operatively coupled to an access point type determiner 812 that can detect a type and/or classification of the access point based at least in part on the pilot identifier. For example, as described, the pilot identifier can have been selected or assigned to the access point based on a type or classification. In this regard, the identifier can be within a range and/or group of identifiers related to the type and/or classification. For example, the access point can be a femtocell, and the access point type determiner 812 can detect that the pilot identifier fits within a group or range of identifiers indicative of femtocells as opposed to other types of cells. In addition, groups or ranges can also indicate aspects related to restricted association, as described, location, service provider, owner, transmission power, band, or periodicity, and/or other aspects related to the access point, such as a type, mobility, etc. Mobile device 800 still further comprises a modulator 814 and transmitter 816 that respectively modulate and transmit signals to, for instance, a base station, another mobile device, etc. Although depicted as being separate from the processor 806, it is to be appreciated that the pilot identifier receiver 810, access point type determiner 812, demodulator 804, and/or modulator 814 can be part of the processor 806 or multiple processors (not shown).

Figure 9:
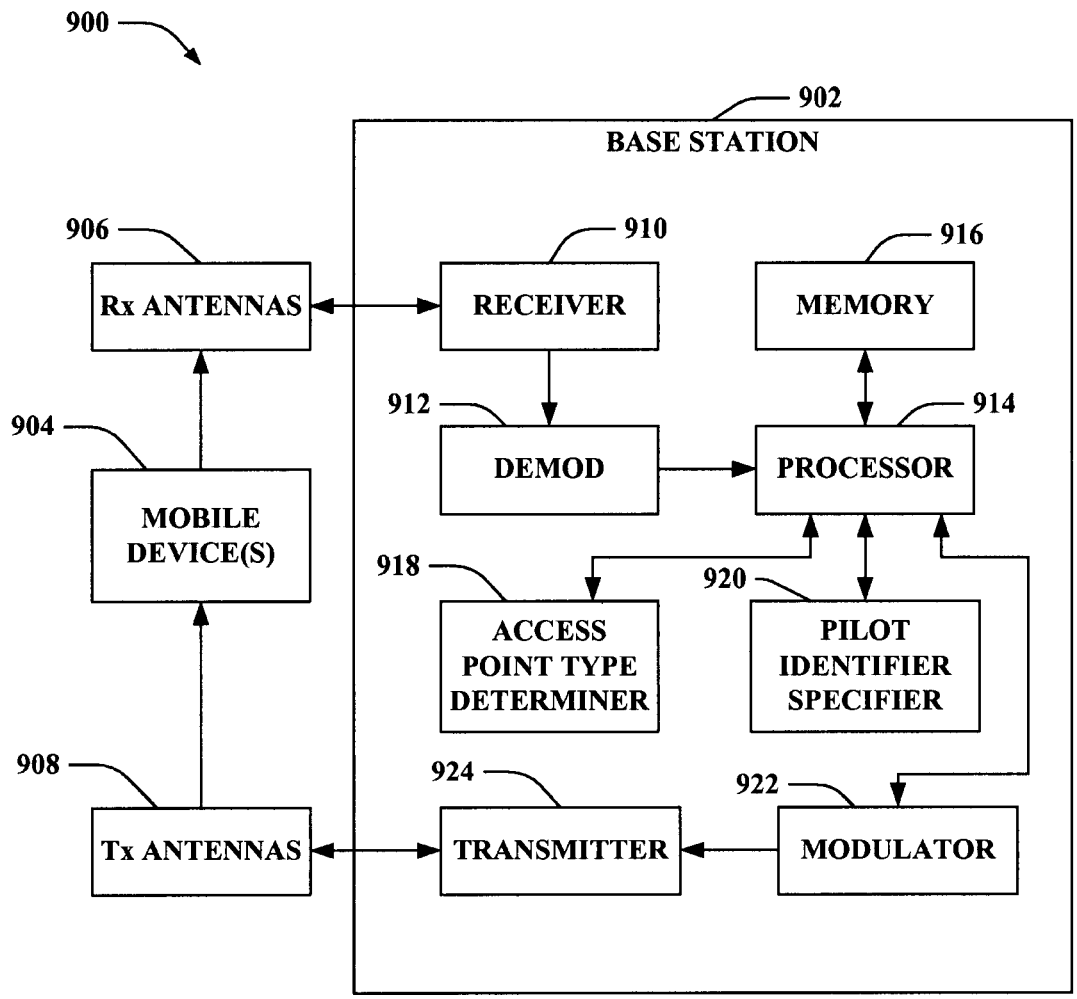
FIG. 9 is an illustration of an example system that selects a pilot identifier indicative of a type of an access point.

FIG. 9 is an illustration of a system 900 that facilitates selecting and transmitting pilot identifiers indicative of access point type or classification. The system 900 comprises a base station 902 (e.g., access point, femtocell, . . . ) with a receiver 910 that receives signal(s) from one or more mobile devices 904 through a plurality of receive antennas 906, and a transmitter 924 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to an access point type determiner 918 that determines a type and/or classification related to the base station 902 and a pilot identifier specifier 920 that selects and/or is assigned a pilot identifier related to the type and/or classification.

According to an example, the access point type determiner 918 can receive or detect a type of the base station 902. This can relate to, for example, whether the base station 902 provides macrocell or femtocell coverage, whether the base station 902 implements restricted association (or an extent to which it implements restricted association), location of the base station 902, mobility of the base station 902, other communications parameters of the base station 902, an owner, owner type, or service provider of the base station 902, and/or the like, as described. The pilot identifier specifier 920 can select a pilot identifier from a group and/or range of identifiers known to indicate the one or more types or classifications related to the base station 902, as described. In addition, the transmitter 924 can transmit the pilot identifier in a pilot signal, in one example, which the mobile device(s) 904 can receive and subsequently utilize the pilot identifier to efficiently determine the one or more types or classifications. Furthermore, although depicted as being separate from the processor 914, it is to be appreciated that the access point type determiner 918, pilot identifier specifier 920, demodulator 912, and/or modulator 922 can be part of the processor 914 or multiple processors (not shown).

Figure 10:
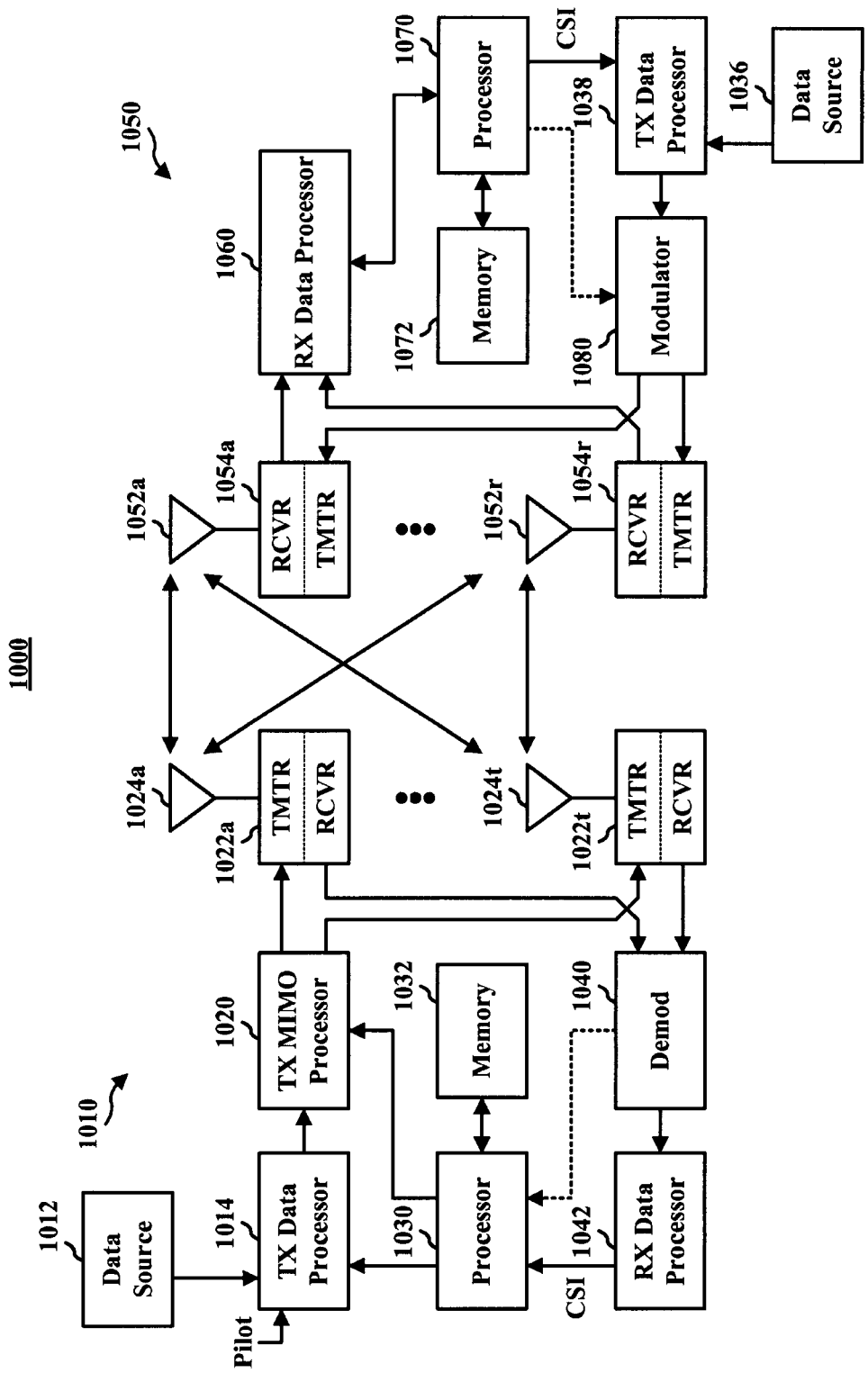
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which preceding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which preceding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
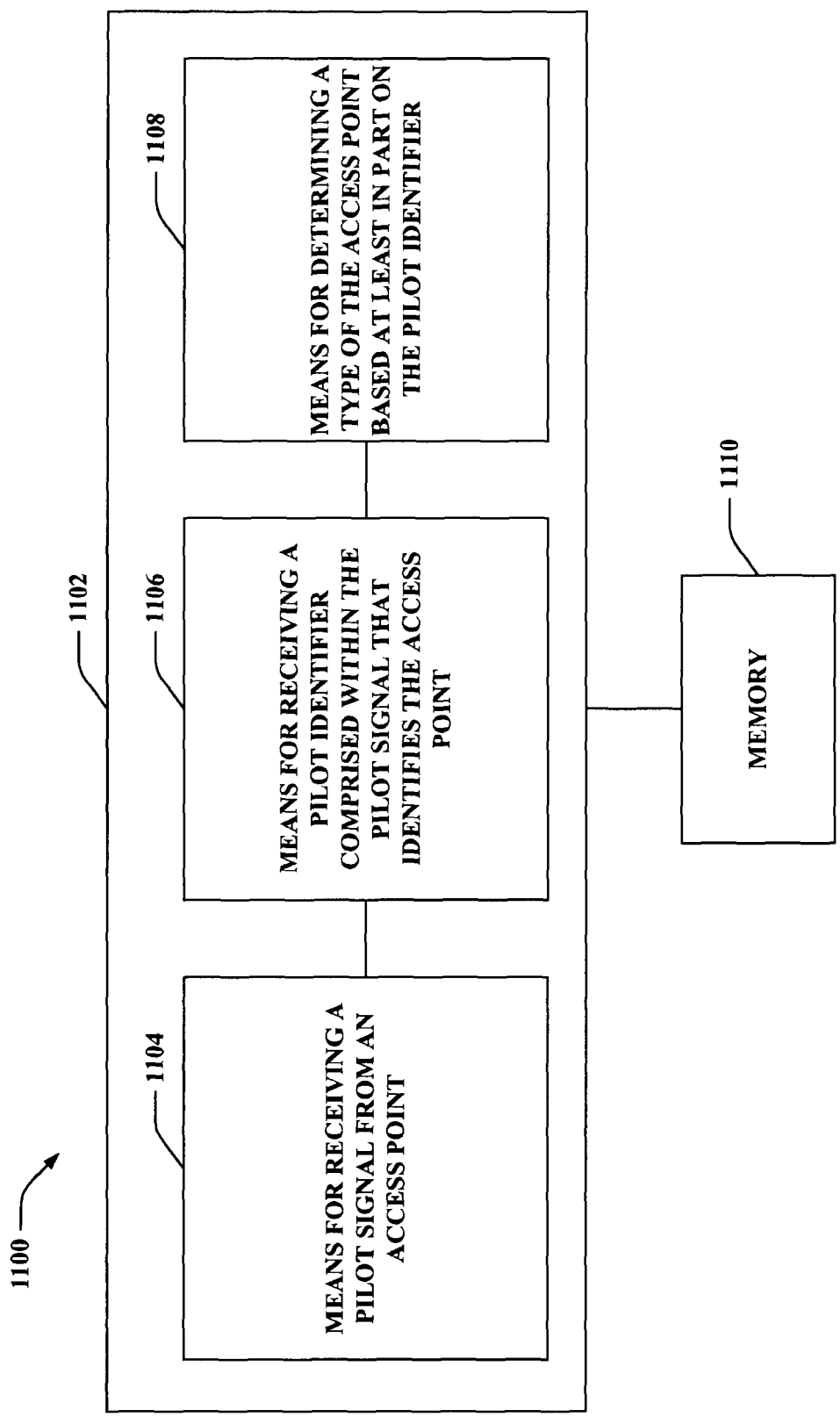
FIG. 11 is an illustration of an example system that determines an access point type based on a determined pilot identifier.

Turning to FIG. 11, illustrated is a system 1100 that utilizes received pilot identifiers to identify types and/or classifications related to one or more access points. System 1100 can reside within a base station, femtocell, mobile device, etc., for instance. As depicted, system 1100 includes functional blocks that can represent functions implemented by a processor, software, or combination thereof (e.g., firmware). System 1100 includes a logical grouping 1102 of electrical components that act in conjunction. Logical grouping 1102 can include means for receiving a pilot signal from an access point 1104. As described, the pilot signal can be transmitted by the access point over a pilot signal channel to identify one or more aspects related to the access point. Moreover, logical grouping 1102 can include means for receiving a pilot identifier comprised within the pilot signal that identifies the access point 1106. The pilot identifier, in this regard, can be utilized to identify the access point; in another example, the pilot identifier can indicate additional information. In this regard, logical grouping 1102 can include means for determining a type of the access point based at least in part on the pilot identifier 1108. As described, the pilot identifier can be selected from a range or group that indicates type and/or classification information related to the access point. Thus, the grouping and/or range information can be utilized to determine the type and/or classification, in one example. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

Figure 12:
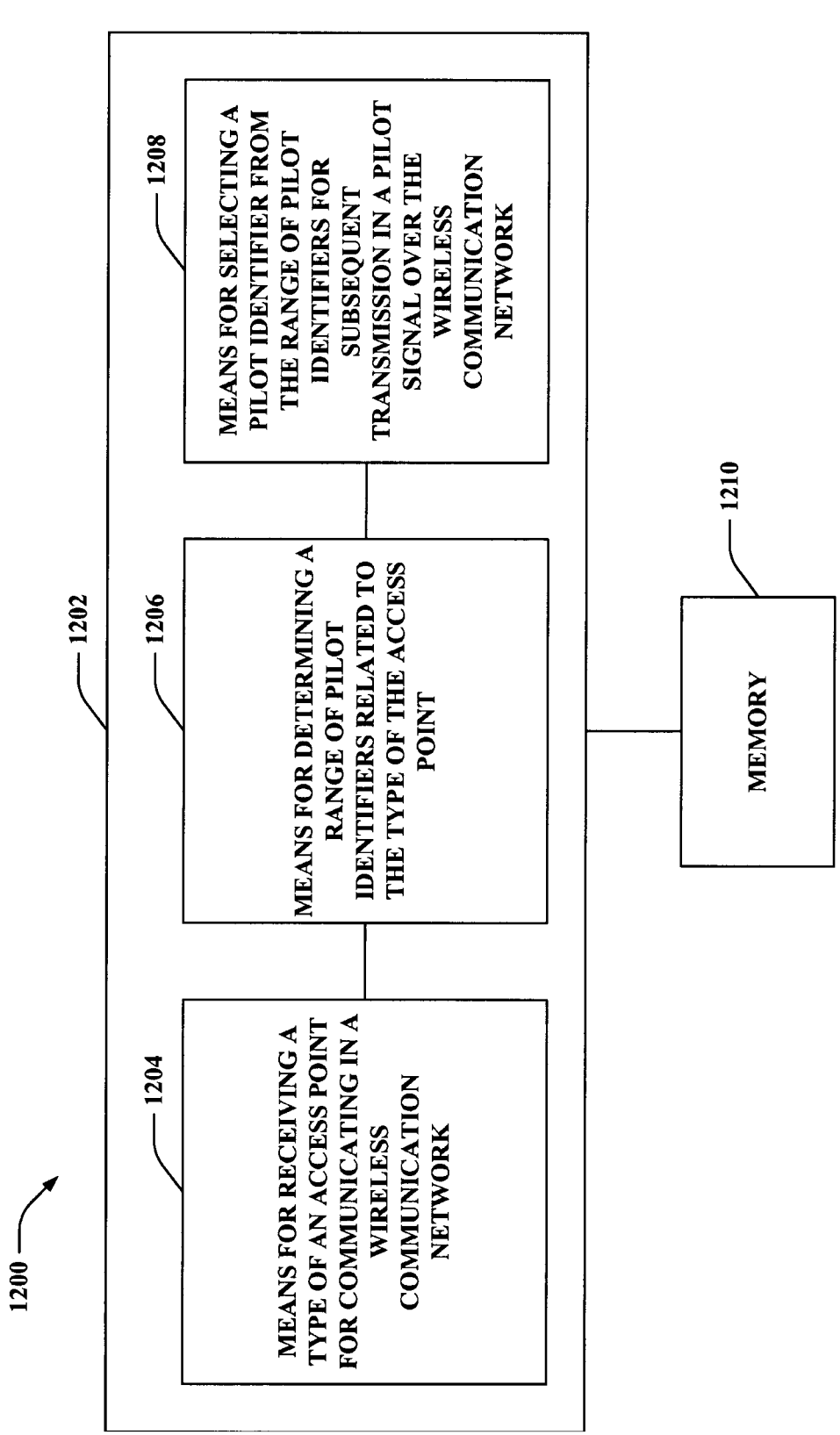
FIG. 12 is an illustration of an example system that selects a pilot identifier to indicate a type of an access point.

Referring to FIG. 12, illustrated is a system 1200 that selects pilot identifiers from groups or ranges to identify a type and/or classification of one or more access points. System 1200 can reside within a base station, femtocell, mobile device, etc., for instance. As depicted, system 1200 includes functional blocks that can represent functions implemented by a processor, software, or combination thereof (e.g., firmware). System 1200 includes a logical grouping 1202 of electrical components that facilitate selecting the pilot identifiers. Logical grouping 1202 can include means for receiving a type of an access point for communicating in a wireless communication network 1204. As described, the type can relate to whether the system 1200, which can be an access point, provides femtocell or macrocell coverage, whether it implements restricted association, a location of the system 1200, an owner or owner type thereof, security measurements, communication parameters, whether the system 1200 is stationary or mobile, and/or the like, as described previously. Moreover, logical grouping 1202 can include means for determining a range of pilot identifiers related to the type of the access point 1206. In this regard, the pilot identifier space can be separated to allow efficient identification of the type and/or classification. Further, logical grouping 1202 can include means for selecting a pilot identifier from the range of pilot identifiers for subsequent transmission in a pilot signal over the wireless communication network 1208. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored as one or more instructions or code on a computer-readable medium. Computer-readable media includes tangible computer storage media. A storage medium may be any available tangible media that can be accessed by a computer. By way of example, such computer-readable media can comprise RAM, ROM, EEPROM, CD- ROM or other optical disk storage, magnetic disk storage or other magnetic storage devices, or any other tangible medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for determining cell information for cell reselection in a wireless communication network, comprising:
   receiving a pilot signal from an access point;
   determining a pilot identifier comprised within the pilot signal, wherein the pilot identifier identifies the access point in the wireless communication network and is associated with an identifier range comprising one of: access points which implement restricted association to restrict access to certain access terminals, and access points which do not implement restricted association;
   determining a type of the access point as implementing restricted association based at least in part on the identifier range in which the pilot identifier falls, wherein the pilot identifier and the type of the access point are determined in an idle mode of operation;
   measuring a parameter of the access point and at least one other access point to rank the access point and the at least one other access point for reselection after the access point has been identified as present in a maintained list of accessible access points that a user equipment (UE) is authorized to access;
   applying an offset to the parameter of the access point to increase consideration for reselection when the access point implements restricted association and is identified in the maintained list of accessible access points, but is not a highest ranked access point before applying the offset, wherein the highest ranked access point before applying the offset is an access point not implementing restricted association; and
   performing a cell reselection based at least in part on selecting the highest ranked access point.

2. The method of claim 1, wherein the pilot identifier falls within the identifier range that indicates the type of the access point as a femtocell.

3. The method of claim 2, further comprising reading a restricted association identifier from the access point based at least in part on the pilot identifier falling within the identifier range that indicates the type of the access point as a femtocell.

4. The method of claim 3, wherein the restricted association identifier indicates the femtocell is restricted with respect to providing signaling, data access, registration, and/or service.

5. The method of claim 3, further comprising requesting communication establishment with the access point based at least in part on verifying the restricted association identifier as within a specified range.

6. The method of claim 2, further comprising reading a sector identifier from the access point based at least in part on the pilot identifier falling within the identifier range that indicates the type of the access point as a femtocell.

7. The method of claim 1, wherein the identifier range in which the pilot identifier falls relates to a smaller coverage access point or a larger coverage access point.

8. The method of claim 1, wherein the identifier range in which the pilot identifier falls relates to a location of the access point.

9. The method of claim 1, wherein the identifier range in which the pilot identifier falls relates to a transmit power of the access point.

10. The method of claim 1, wherein the identifier range in which the pilot identifier falls relates to a frequency band utilized by the access point for communication.

11. The method of claim 1, wherein the identifier range in which the pilot identifier falls relates to a transmission periodicity utilized by the access point for communication.

12. The method of claim 1, wherein the identifier range in which the pilot identifier falls relates to whether the access point is mobile or stationary.

13. The method of claim 1, further comprising requesting communication establishment with the access point based at least in part on the determined type of the access point.

14. The method of claim 1, further comprising ranking the access point for reselection based at least in part on the determined type of the access point.

15. A wireless communications apparatus, comprising:
   at least one processor configured to:
      receive a pilot signal from an access point;
      obtain a pilot identifier comprised within the pilot signal, wherein the pilot identifier identifies the access point in a wireless communication network and is associated with an identifier range comprising one of: access points which implement restricted association to restrict access to certain access terminals, and access points which do not implement restricted association;
      detect a type of the access point as implementing restricted association based at least in part on the identifier range in which the pilot identifier falls, wherein the pilot identifier and the type of the access point are determined by the wireless communication apparatus in an idle mode of operation;
      measure a parameter of the access point and at least one other access point to rank the access point and the at least one other access point for reselection after the access point has been identified as present in a maintained list of accessible access points that a user equipment (UE) is authorized to access;
      apply an offset to the parameter of the access point to increase consideration for reselection when the access point implements restricted association and is identified in the maintained list of accessible access points, but is not a highest ranked access point before applying the offset, wherein the highest ranked access point before applying the offset is an access point not implementing restricted association; and
      perform a cell reselection based at least in part on selecting the highest ranked access point; and
   a memory coupled to the at least one processor.

16. The wireless communications apparatus of claim 15, wherein the at least one processor is further configured to:
   rank the access point for reselection based at least in part on the determined type of the access point.

17. A wireless communications apparatus that facilitates determining information related to an access point in a wireless communication network, comprising:
   means for receiving a pilot signal from an access point;
   means for receiving a pilot identifier comprised within the pilot signal, wherein the pilot identifier identifies the access point in the wireless communication network and is associated with an identifier range comprising one of: access points which implement restricted association to restrict access to certain access terminals, and access points which do not implement restricted association;

means for determining a type of the access point as implementing restricted association based at least in part on the pilot identifier, wherein the pilot identifier and the type of the access point are determined by the wireless communication apparatus in an idle mode of operation;

means for measuring a parameter of the access point and at least one other access point to rank the access point and the at least one other access point for reselection after the access point has been identified as present in a maintained list of accessible access points that a user equipment (UE) is authorized to access;

means for applying an offset to the parameter of the access point to increase consideration for reselection when the access point implements restricted association and is identified in the maintained list of accessible access points, but is not a highest ranked access point before applying the offset, wherein the highest ranked access point before applying the offset is an access point not implementing restricted association; and means for performing a cell reselection based at least in part on selecting the highest ranked access point.

18. The wireless communications apparatus of claim 17, further comprising:
means for ranking the access point for reselection based at least in part on the determined type of the access point.

19. A non-transitory computer-readable medium comprising:
code for causing at least one computer to receive a pilot signal from an access point;
code for causing the at least one computer to determine a pilot identifier comprised within the pilot signal, wherein the pilot identifier identifies the access point in a wireless communication network and is associated with an identifier range comprising one of: access points which implement restricted association to restrict access to certain access terminals, and access points which do not implement restricted association;
code for causing the at least one computer to determine a type of the access point as implementing restricted association based at least in part on the identifier range in which the pilot identifier falls, wherein the pilot identifier and the type of the access point are determined in an idle mode of operation;
code for causing the at least one computer to measure a parameter of the access point and at least one other access point to rank the access point and the at least one other access point for reselection after the access point has been identified as present in a maintained list of accessible access points that a user equipment (UE) is authorized to access;
code for causing the at least one computer to apply an offset to the parameter of the access point to increase consideration for reselection when the access point implements restricted association and is identified in the maintained list of accessible access points, but is not a highest ranked access point before applying the offset, wherein the highest ranked access point before applying the offset is an access point not implementing restricted association; and
code for causing the at least one computer to perform a cell reselection based at least in part on selecting the highest ranked access point.

20. The non-transitory computer-readable medium of claim 19, further comprising:
code for causing the at least one computer to rank the access point for reselection based at least in part on the determined type of the access point.

21. A method for selecting pilot identifiers for access points in a wireless communication network, comprising:
determining a type of an access point for communicating in the wireless communication network;
determining a range of pilot identifiers related to the type of the access point, wherein the range of pilot identifiers comprises one of: access points which implement restricted association to restrict access to certain access terminals, and access points which do not implement restricted association;
selecting a pilot identifier from the range of pilot identifiers for subsequent transmission in a pilot signal over the wireless communication network for identifying the access point in the wireless communication network as a restricted association access point or a non-restricted association access point according to the range of pilot identifiers in which the pilot identifier falls; and
determining a parameter of the access point, wherein the parameter facilitates ranking the access point among a plurality of access points after the access point has been identified as present in a maintained list of accessible access points that a mobile device is authorized to access, and cell reselection by the mobile device based at least in part on a highest ranked access point being selected, wherein the parameter is applied with an offset to increase consideration for reselection when the access point implements restricted association and is identified in the maintained list of accessible access points, but is not the highest ranked access point before the offset being applied, wherein the highest ranked access point before the offset being applied is an access point not implementing restricted association.

22. The method of claim 21, wherein the range of pilot identifiers is determined based at least in part on a geographic location of the access point.

23. The method of claim 21, wherein the range of pilot identifiers is determined based at least in part on a service provider associated with the access point.

24. The method of claim 21, wherein the range of pilot identifiers is determined based at least in part on an owner and/or type of owner associated with the access point.

25. The method of claim 21, wherein the range of pilot identifiers is determined based at least in part on a transmission frequency band of the access point.

26. The method of claim 21, wherein the range of pilot identifiers is determined based at least in part on a transmission periodicity of the access point.

27. The method of claim 21, wherein the range of pilot identifiers is determined based at least in part on whether the access point utilizes a secure or insecure backhaul to connect to a core wireless network.

28. The method of claim 21, wherein the range of pilot identifiers is determined based at least in part on whether the access point is mobile or stationary.

29. The method of claim 21, wherein the determined type of the access point is a femtocell.

30. The method of claim 29, further comprising indicating a restricted association identifier in the pilot signal based on determining the type of the access point as a femtocell.

31. A wireless communications apparatus, comprising:
at least one processor configured to:
   detect a type of an access point for communicating in a wireless communication network;
   determine a range of pilot identifiers related to the type of the access point, the range of pilot identifiers comprises one of: access points which implement restricted association to restrict access to certain access terminals, and access points which do not implement restricted association;
   select a pilot identifier from the range of pilot identifiers for subsequent transmission in a pilot signal over the wireless communication network for identifying the access point in the wireless communication network as a restricted association access point or a non-restricted association access point according to the range of pilot identifiers in which the pilot identifier falls; and
   determine a parameter of the access point, wherein the parameter facilitates ranking the access point among a plurality of access points after the access point has been identified as present in a maintained list of accessible access points that a mobile device is authorized to access, and cell reselection by the mobile device based at least in part on a highest ranked access point being selected, wherein the parameter is applied with an offset to increase consideration for reselection when the access point implements restricted association and is identified in the maintained list of accessible access points, but is not the highest ranked access point before the offset being applied, wherein the highest ranked access point before the offset being applied is an access point not implementing restricted association; and
a memory coupled to the at least one processor.

32. A wireless communications apparatus that facilitates indicating access point information in wireless communications, comprising:
   means for receiving a type of an access point for communicating in a wireless communication network;
   means for determining a range of pilot identifiers related to the type of the access point, wherein the range of pilot identifiers comprises one of: access points which implement restricted association to restrict access to certain access terminals, and access points which do not implement restricted association;
   means for selecting a pilot identifier from the range of pilot identifiers for subsequent transmission in a pilot signal over the wireless communication network for identifying the access point in the wireless communication network as a restricted association access point or a non-restricted association access point according to the range of pilot identifiers in which the pilot identifier falls; and
   means for determining a parameter of the access point, wherein the parameter facilitates ranking the access point among a plurality of access points after the access point has been identified as present in a maintained list of accessible access points that a mobile device is authorized to access, and cell reselection by the mobile device based at least in part on a highest ranked access point being selected, wherein the parameter is applied with an offset to increase consideration for reselection when the access point implements restricted association and is identified in the maintained list of accessible access points, but is not the highest ranked access point before the offset being applied, wherein the highest ranked access point before the offset being applied is an access point not implementing restricted association.

33. A non-transitory computer-readable medium comprising:
   code for causing at least one computer to determine a type of an access point for communicating in a wireless communication network;
   code for causing the at least one computer to determine a range of pilot identifiers related to the type of the access point, wherein the range of pilot identifiers comprises one of: access points which implement restricted association to restrict access to certain access terminals, and access points which do not implement restricted association;
   code for causing the at least one computer to select a pilot identifier from the range of pilot identifiers for subsequent transmission in a pilot signal over the wireless communication network for identifying the access point in the wireless communication network as a restricted association access point or a non-restricted association access point according to the range of pilot identifiers in which the pilot identifier falls; and
   code for causing the at least one computer to determine a parameter of the access point, wherein the parameter facilitates ranking the access point among a plurality of access points after the access point has been identified as present in a maintained list of accessible access points that a mobile device is authorized to access, and cell reselection by the mobile device based at least in part on a highest ranked access point being selected, wherein the parameter is applied with an offset to increase consideration for reselection when the access point implements restricted association and is identified in the maintained list of accessible access points, but is not the highest ranked access point before the offset being applied, wherein the highest ranked access point before the offset being applied is an access point not implementing restricted association.

34. An apparatus, comprising:
   an access point type specifier that determines a type of an access point for communicating in a wireless communication network; and
   a pilot identifier selector that determines a range of pilot identifiers related to the type of the access point, wherein the range of pilot identifiers comprises one of: access points which implement restricted association to restrict access to certain access terminals, and access points which do not implement restricted association, selects a pilot identifier from the range of pilot identifiers for subsequent transmission in a pilot signal over the wireless communication network for identifying the access point in the wireless communication network as a restricted association access point or a non-restricted association access point according to the range of pilot identifiers in which the pilot identifier falls, and determines a parameter of the access point, wherein the parameter facilitates ranking the access point among a plurality of access points after the access point has been identified as present in a maintained list of accessible access points that a mobile device is authorized to access, and cell reselection by the mobile device based at least in part on a highest ranked access point being selected, wherein the parameter is applied with an offset to increase consideration for reselection when the access point implements restricted association and is identified in the maintained list of accessible access points, but is not the highest ranked access point before the offset being applied, wherein the highest ranked access point before the offset being applied is an access point not implementing restricted association.

35. The apparatus of claim 34, wherein the pilot identifier selector determines the range of pilot identifiers based at least in part on a geographic location of the access point.

36. The apparatus of claim 34, wherein the pilot identifier selector determines the range of pilot identifiers based at least in part on a service provider associated with the access point.

37. The apparatus of claim 34, wherein the pilot identifier selector determines the range of pilot identifiers based at least in part on an owner and/or type of owner associated with the access point.

38. The apparatus of claim 34, wherein the pilot identifier selector determines the range of pilot identifiers based at least in part on a transmission frequency band of the access point.

39. The apparatus of claim 34, wherein the pilot identifier selector determines the range of pilot identifiers based at least in part on a transmission periodicity of the access point.

40. The apparatus of claim 34, wherein the access point type specifier determines the type of the access point as a femtocell.

41. The apparatus of claim 40, further comprising a restricted association specifier that indicates a restricted association identifier in the pilot signal based on determining the type of the access point as femtocell.

* * * * *